(12) United States Patent
Kirby et al.

(10) Patent No.: US 11,094,010 B2
(45) Date of Patent: *Aug. 17, 2021

(54) SYSTEM AND METHOD FOR CLEARING TRANSACTIONS

(71) Applicant: Tradeweb Markets, LLC, New York, NY (US)

(72) Inventors: Elisabeth Kirby, New York, NY (US); Kevin Hill, Pampisford (GB); Ian Stocks, Livingston, NJ (US)

(73) Assignee: Tradeweb Markets LLC, New York, NY (US)

(*) Notice: Subject to any disclaimer, the term of this patent is extended or adjusted under 35 U.S.C. 154(b) by 315 days.

This patent is subject to a terminal disclaimer.

(21) Appl. No.: 15/724,412

(22) Filed: Oct. 4, 2017

(65) Prior Publication Data

US 2018/0033083 A1 Feb. 1, 2018

Related U.S. Application Data

(63) Continuation of application No. 13/832,882, filed on Mar. 15, 2013, now Pat. No. 9,786,006.

(60) Provisional application No. 61/615,533, filed on Mar. 26, 2012.

(51) Int. Cl.
*G06Q 40/04* (2012.01)
*G06Q 40/06* (2012.01)

(52) U.S. Cl.
CPC ............ *G06Q 40/04* (2013.01); *G06Q 40/06* (2013.01)

(58) Field of Classification Search
CPC ........ G06Q 10/00; G06Q 20/00; G06Q 30/00; G06Q 40/00; G06Q 40/04

USPC ........................................................ 705/3–44
See application file for complete search history.

(56) References Cited

U.S. PATENT DOCUMENTS

| | | | | |
|---|---|---|---|---|
| 7,130,789 B2* | 10/2006 | Glodjo | .................. | G06Q 20/10 705/37 |
| 7,747,514 B2* | 6/2010 | Bloom | ............... | G06Q 30/0601 705/35 |
| 7,769,678 B2* | 8/2010 | Toffey | ................... | G06Q 40/02 705/37 |
| 7,991,647 B2* | 8/2011 | Lutnick | ............. | G06Q 30/0601 705/26.1 |
| 7,996,296 B2 | 8/2011 | Lange | | |
| 8,380,612 B2* | 2/2013 | Hanson | .................. | G06Q 40/06 705/37 |

(Continued)

OTHER PUBLICATIONS

"Financial Market Structure: A Longer View", Proquest Id: 292913732, American Banker New York, NY Feb. 6 (Year: 1987).*

(Continued)

*Primary Examiner* — Frantzy Poinvil
(74) *Attorney, Agent, or Firm* — Stroock & Stroock & Lavan LLP

(57) ABSTRACT

A trading platform for trading financial instruments that provides the ability to manage customer credit limits, assess credit risks, and provide clearing certainty of trades. In an exemplary embodiment, the trading platform includes computer software modules and provides graphical user interfaces to handle the process of assessing credit risk, obtaining clearing certainty from a clearing member prior to trade execution, and providing notices of the existence or absence of clearing certainty with regard to particular trade requests.

12 Claims, 30 Drawing Sheets

(56) References Cited

U.S. PATENT DOCUMENTS

| | | | | |
|---|---|---|---|---|
| 8,645,260 B2* | 2/2014 | Hirani | | G06Q 40/04 705/37 |
| 9,786,006 B2* | 10/2017 | Kirby | | G06Q 40/04 |
| 10,832,321 B2* | 11/2020 | Gooch | | G06Q 40/04 |
| 2004/0181435 A9* | 9/2004 | Snell | | G06Q 10/10 705/4 |
| 2005/0149428 A1* | 7/2005 | Gooch | | G06Q 40/04 705/37 |
| 2006/0080216 A1* | 4/2006 | Hausman | | G06Q 40/04 705/37 |
| 2007/0118455 A1* | 5/2007 | Albert | | G06Q 40/04 705/37 |
| 2007/0168276 A1* | 7/2007 | Glodjo | | G06Q 40/025 705/37 |
| 2008/0270278 A1* | 10/2008 | Cummings | | G06Q 40/00 705/35 |
| 2008/0280278 A1* | 11/2008 | Chu | | G09B 19/0092 434/238 |
| 2009/0048964 A1 | 2/2009 | Bloom | | |
| 2009/0055306 A1* | 2/2009 | Hirani | | G06Q 40/06 705/37 |
| 2009/0248561 A1* | 10/2009 | McIntosh | | G06Q 40/00 705/35 |
| 2010/0121756 A1* | 5/2010 | Harrington | | G06Q 40/00 705/37 |
| 2010/0138372 A1* | 6/2010 | Palmer | | G06N 3/08 706/25 |
| 2011/0047094 A1* | 2/2011 | Altomare | | G06Q 40/06 705/36 R |
| 2011/0153488 A1* | 6/2011 | Hirani | | G06Q 40/06 705/37 |
| 2012/0197776 A1 | 8/2012 | Studnitzer | | |
| 2012/0284160 A1 | 11/2012 | Lutnick et al. | | |
| 2013/0254089 A1* | 9/2013 | Kirby | | G06Q 40/04 705/37 |
| 2014/0095375 A1 | 4/2014 | Studnitzer | | |

OTHER PUBLICATIONS

International Preliminary Report on Patentability dated Oct. 9, 2014 in International Application No. PCT/US2013/033657.
Extended European Search Report dated Oct. 29, 2015 in European Patent Application No. 13767449.5.
Search Report and Written Opinion dated Jun. 13, 2013 in International Application No. PCT/US2013/033657.
Communication pursuant to Article 94(3) EPC dated Sep. 28, 2018 in European Patent Application No. 13767449.5.
Extended European Search Report dated Feb. 13, 2020 in European Patent Application No. 19210452.9.

* cited by examiner

SYSTEM AND METHOD FOR CLEARING TRANSACTIONS

CROSS-REFERENCE TO RELATED APPLICATIONS

This application is a continuation of U.S. application Ser. No. 13/832,882, now U.S. Pat. No. 9,786,006, filed Mar. 15, 2013 which claims priority to U.S. Provisional Application No. 61/615,533, filed Mar. 26, 2012, entitled SYSTEM AND METHOD FOR CLEARING TRANSACTIONS, which are incorporated herein by reference.

COPYRIGHT NOTICE

A portion of the disclosure of this patent document may contain material which is subject to copyright protection. The copyright owner has no objection to the facsimile reproduction by any one of the patent disclosure, as it appears in the Patent and Trademark office patent files or records, but otherwise reserves all copyright rights whatsoever.

BACKGROUND OF THE INVENTION

Field of the Invention

The embodiments of the present invention relate generally to systems and methods for trading financial instruments and, more particularly, to systems and methods for managing customer credit limits and determining credit risk to quantify certainty of clearing.

Description of the Related Art

With the advent of new laws, such as the Dodd-Frank legislation, the ability to determine credit risks and increase clearing certainty has become more important to traders.

On Mar. 20, 2012, the U.S. Commodity Futures Trading Commission (CFTC) issued final rules under Title VII of the Dodd-Frank Act for clearing members of non-security-based swap clearinghouses. The final rules are directed to parameters for documentation between customers and swap clearing members, the timing of acceptance/rejection of swaps for clearing by clearing organizations and clearing members, and risk management protocols.

Under the Dodd-Frank Act, certain clearing members must establish credit-based and market-risk-based limits on clearing customers' swap position sizes, order sizes, margin requirements and other related factors. Such cleaning members are also required to use automated means to screen orders for compliance with these risk-based customer limits and monitor for adherence to risk-based limits both intraday and overnight.

Accordingly, there is a need for trading systems and methods that manage customer credit limits and assess credit risks and clearing certainty of trades.

It should be noted that although the below description describes the systems and methods of the present invention in the context of financial trading platforms, it can be appreciated by one or ordinary skill in the art that certain aspects of the present invention can be used in conjunction with other products and applications without departing from the scope of the invention.

SUMMARY OF THE INVENTION

The present invention satisfies these needs. Exemplary embodiments of the present invention are directed to a trading platform for trading financial instruments that includes the ability to manage customer credit limits, assess credit risks, and provide clearing certainty of trades.

In one exemplary embodiment, the trading platform is in a communication with one or more customer computers and one or more clearing member (or dealer) computers. The trading platform is capable of accepting information from a customer (via the customer computer) relating to a trade order. The trading platform is also capable of storing credit information relating to the customer and/or the trade order. This credit information may be provided by one or more clearing members and/or may be based on risk calculations performed by particularly programmed software modules within the platform. The platform is not required to store credit information and credit information may not be available in all instances. When the customer requests a quote for a trade order, the platform determines whether clearing certainty is provided for the trade order and/or customer. In an exemplary embodiment, the platform may base its clearing certainty determination on stored credit information. However, where no credit information or insufficient credit information is available, the trading platform may transmit the customer's request for a quote to the one or more clearing members (which may be selected by the customer) to obtain an indication of or denial of clearing certainty from the clearing member (via the clearing member's computer). The platform may receive the clearing member's indication or denial of clearing certainty, make a determination of clearing certainty based on the clearing member's response, and transmit the clearing certainty determination to the customer.

Thus, as is evident from the above-description, the trading platform integrates various software modules and communication links to assess credit risk and provide clearing certainty. Other features and advantages of the present invention will become apparent in the following detailed description of exemplary embodiments of this invention with reference to the accompanying drawings.

This summary section is meant merely to illustrate certain features of the invention, and is not meant to limit the scope of the invention in any way. The failure to discuss a specific feature or embodiment of the invention, or the inclusion of one or more features in this summary section, should not be construed to limit the invention as claimed.

BRIEF DESCRIPTION OF THE DRAWINGS

Embodiments of the invention will be described and shown in detail by way of example with reference to the accompanying drawings in which:

Figure 3:
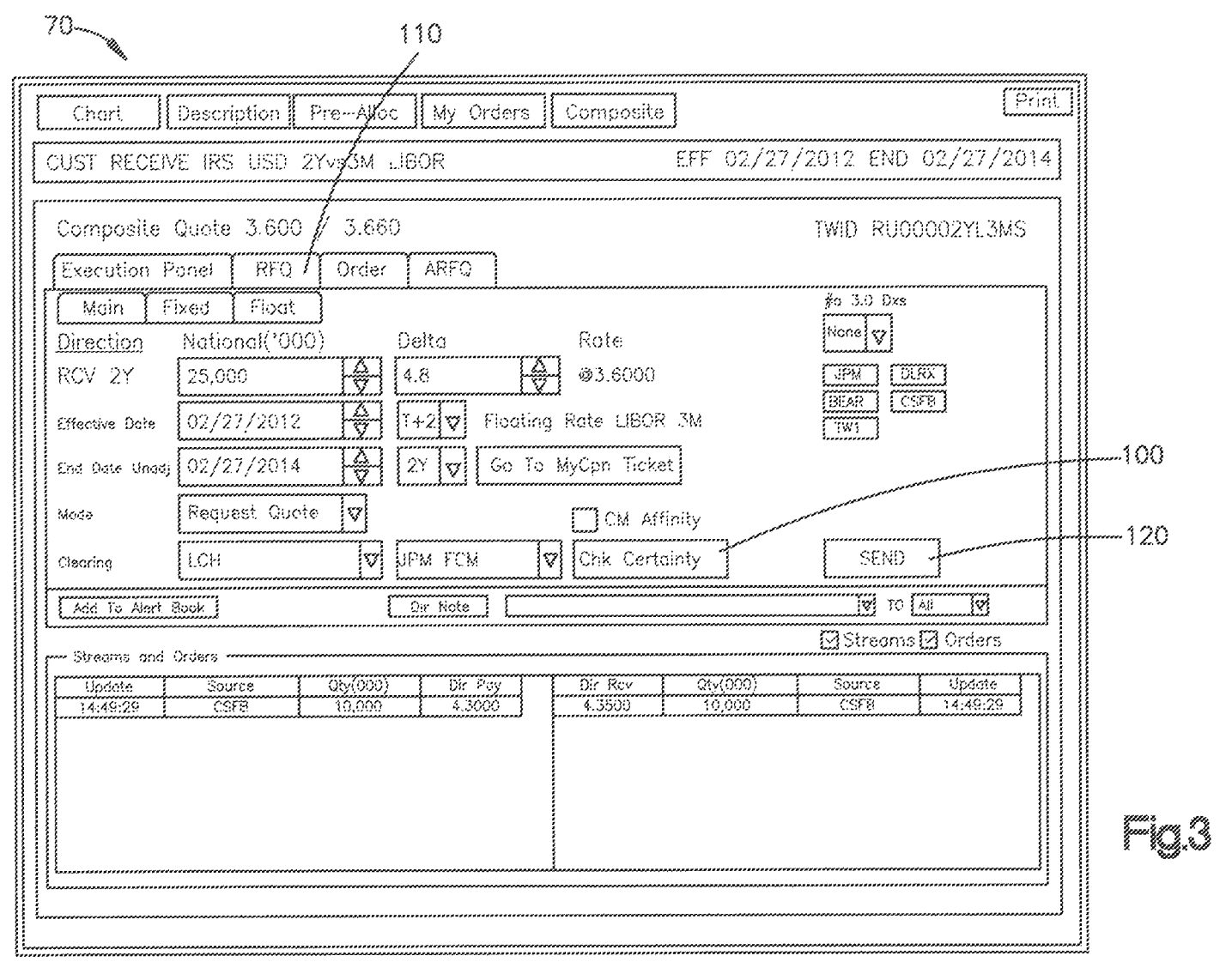
Figure 4:
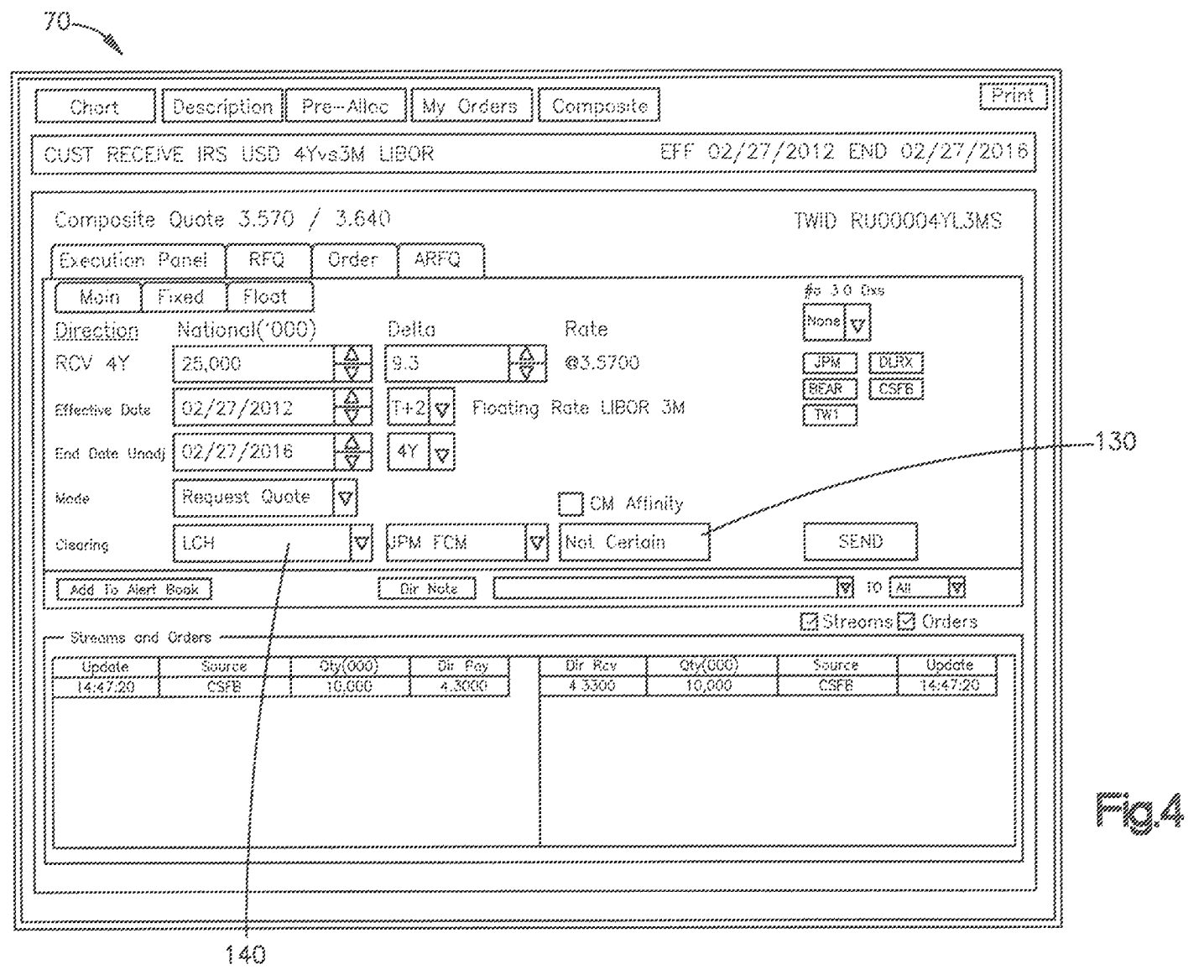
Figure 5:
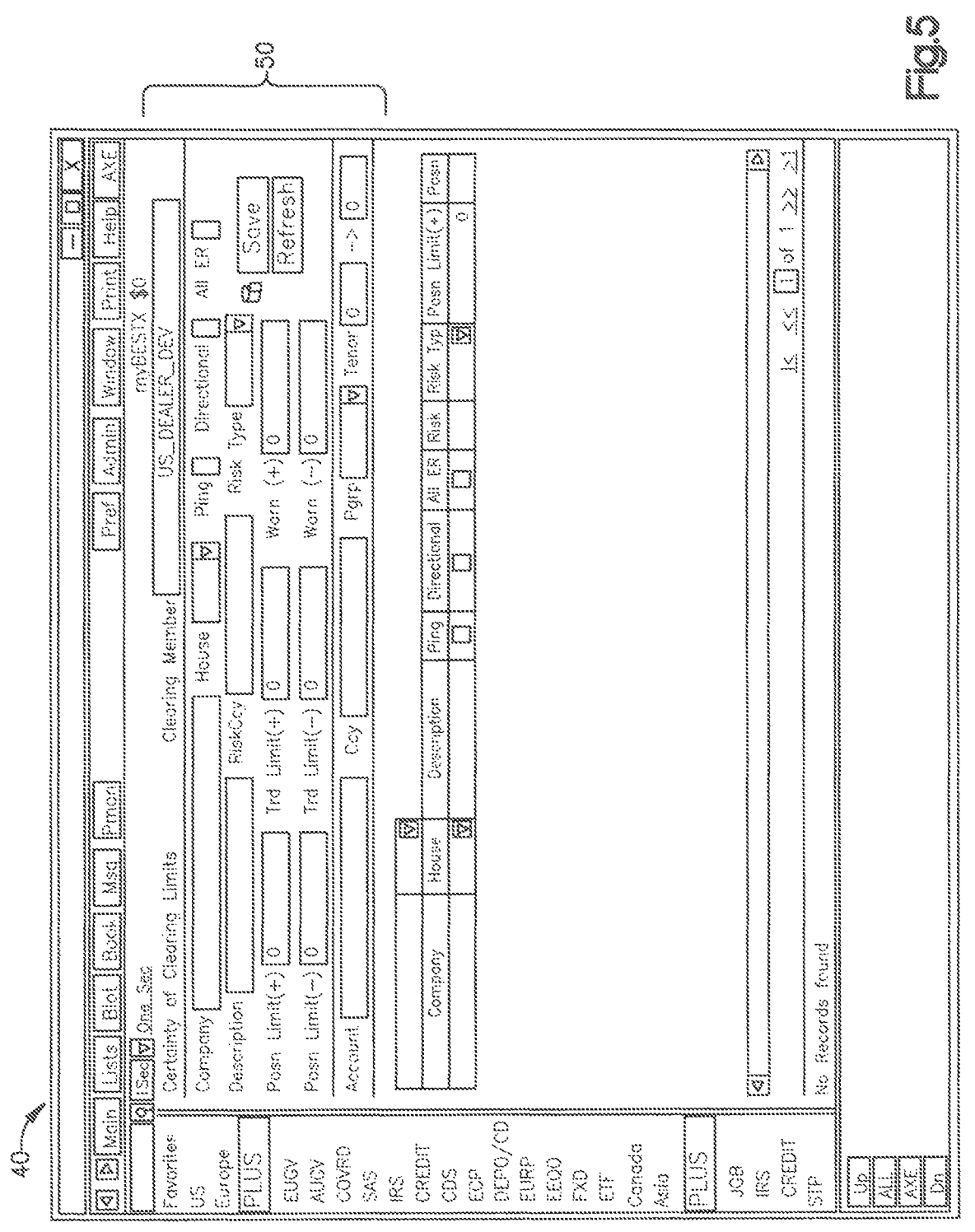

FIGS. 3-10 are screen shots depicting exemplary graphical user interfaces of various features of the trading platform;

FIG. 25-28 are screen shots depicting exemplary graphical user interfaces of various features of the trading platform.

FIG. 31 is a screen shot depicting an exemplary graphical user interface of various features of the trading platform.

DETAILED DESCRIPTION OF EXEMPLARY EMBODIMENTS

In accordance with various embodiments of the invention, and as shown herein, various systems and methods are disclosed which generally provide a platform to facilitate trades of financial instruments, which provides for the management of customer credit limits and assessment of credit risks and clearing certainty of trades.

In general, a computerized electronic trading system and method permits a customer using a customer computer to electronically request a quote from one or more dealers using a dealer computer for a financial instrument through a network. The centralized computer system includes one or more computers and at least one message server for communicating electronic messages to and between the customer computer, dealer computer, and clearing member (using a clearing member computer), and a database system including at least one storage device, the database system storing at least data related to credit limits and credit risks in connection with one or more requests for quotations of financial instruments and/or trades. The computerized electronic trading system is programmed with a credit and/or clearing certainty modules, including one or more sub-components to handle clearing data such as data related to credit limits, authorizations, and denials. As used herein, reference to customer, dealer, and/or clearing member may refer to the customer's, dealer's, and/or clearing member's computer(s), respectively.

As used herein, "customer" may refers to either or both the firm level as well as any of the subaccounts therein.

Figure 1:
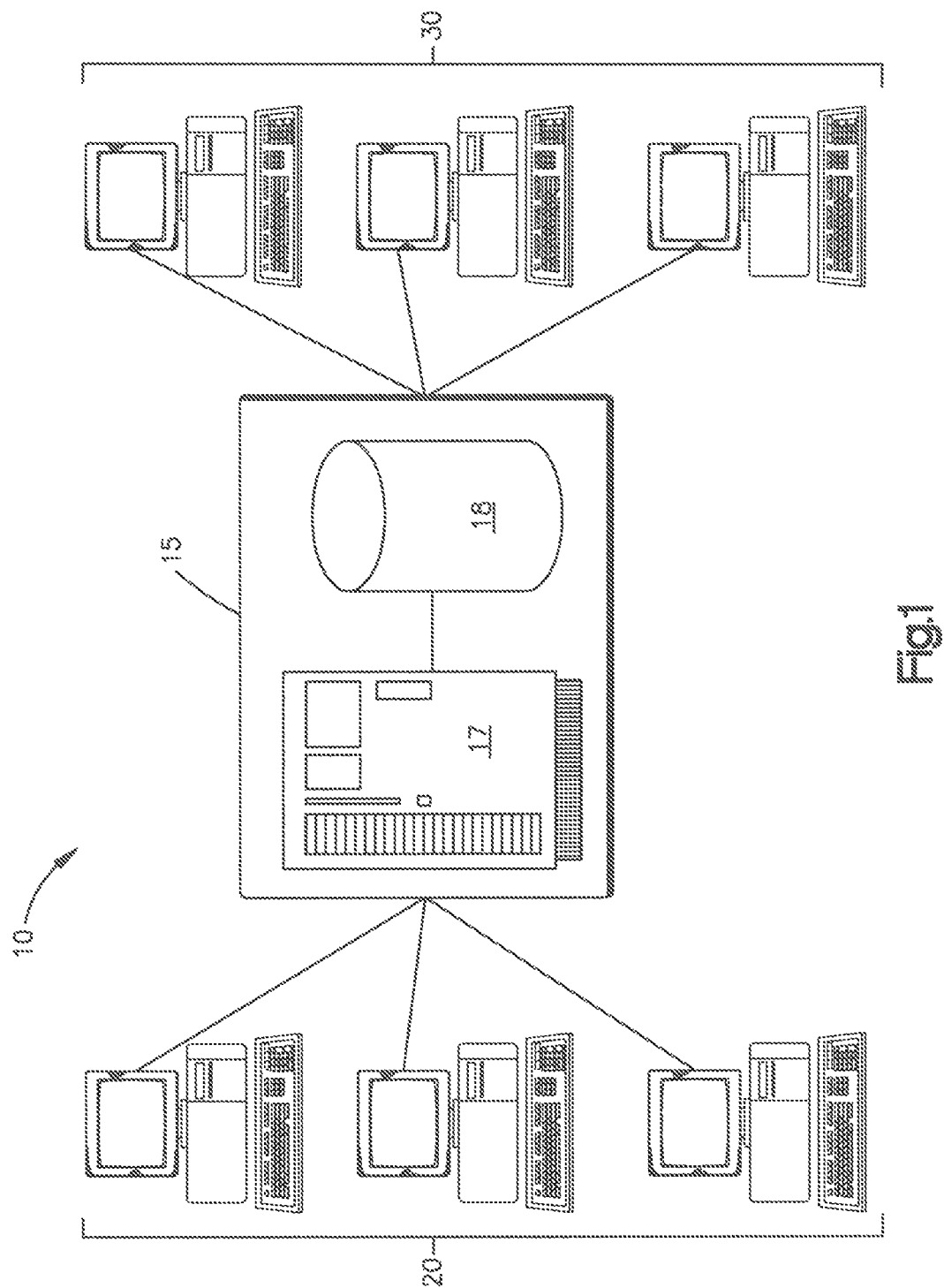
FIG. 1 is a diagram of an exemplary embodiment of a trading platform in communication with various customer and clearing member computers.

In one embodiment, with reference to FIG. 1, a technical solution is provided in the form of an electronic trading platform 10 in which a customer using a customer computer can transmit a request for a quote from a dealer for a selected financial instrument. A Clearing Member 30 provides credit limit data to facilitate clearing the trade. Examples of Clearing Members 30 would be banks who have registered as Clearing members with one or more clearing houses. Generally speaking, the electronic trading platform 10 comprises a centralized computer system 15, including one or more computers and related storage devices for receiving transmitting and storing data related to the trading of selected financial instrument, including clearing data such as credit risks and credit limits.

As shown in the exemplary embodiment of FIG. 1, a preferred embodiment of a centralized computer system 15 generally comprises one, or more computer systems 17 and databases 18 and related database management systems. One skilled in the art will recognize that the computer systems may as a matter of design choice include any number and configurations of computers and databases, which may be used separately or in tandem to support the traffic and processing needs necessary in operation at one time. If multiple computers are used, the computer may be configured using a round-robin configuration to handle end user traffic.

The centralized computer system 15 is communicatively interconnected to a local area network (not shown), on the one hand, and communicatively connected to a wide area network (shown generally by the interconnecting lines in FIG. 1), on the other hand, to a plurality of customer and Clearing Member computers 20, 30. In this way, the centralized computer system 15 can receive electronic messages to and from the customer and Clearing Member computers 20, 30 and transmit said message to the appropriate recipient. Preferably, messages will be written in FPML and sent via MQ and FIX. Internally, the centralized computer system 15 is interconnected in order to process and store information related to the trading of financial instruments, including credit limit and credit approval/denial data as contemplated herein, and as further detailed below.

Various servers and other computer systems described herein include such art recognized components as are ordinarily found in server systems, including but not limited to processors, RAM, ROM, clocks, hardware drivers, associated storage, and the like. One skilled in the art will recognize, however, that because multiple users may be accessing such server at any given time it may become preferable to utilize multiple servers and databases, which may be used separately or in tandem to support the systems' traffic and processing, such as, by way of non-limiting example, a round-robin configuration utilizing multiple server systems. Customer and Clearing member computers 20, 30 can be personal computers including at least a network adapter and web browsing capability, but may also include mobile and handheld devices such as PDAs, mobile smart phones (e.g., Blackberry®, iPhone®, Treo®, and the like), or other wireless devices. Furthermore, in certain embodiments, user computers can be network systems having components such as servers, databases, etc.

In a preferred embodiment, centralized computer system 15 is programmed with computer program code comprising a plurality of programming modules and sub-components. In accordance with the present invention, in one embodiment, the centralized computer system 15 is programmed with at least a RFQ module, a RFM module, with each being programmed to include a clearing sub-component to handle the exchange of messages related to the clearing of trades and clearing data such as credit limit data and credit authorizations and denials.

It should be noted that although the embodiments described may use multiple software modules for performing the various functions of the system, other embodiments could be implemented using any number of modules, with any single module incorporating the functions of several, or all, of the modules. The precise design of the software and the programming language used may be designed differently within the scope of the present invention. The software modules can be created using art recognized programming languages, including but not limited to C++, ASP, Java, C#, ASP.NET, or PHP or any combination of known or later developed programming languages that allow the functionality described.

It will also be understood that, although the various embodiments of the present invention described herein are being described in terms of web-based centralized server architecture, a thin client, fat-client, or peer-to-peer type arrangement could be substituted for the system architecture described herein and are within the scope of the present invention. Additionally, the programming described herein can be stored in a machine readable form on a computer readable medium, such as a CD-ROM or DVD, and distributed to users for installation on user computers. Alternatively, such programming can be downloaded via network. In either embodiment, communication with the system may be effected across known networks, such as the Internet.

Figure 2:
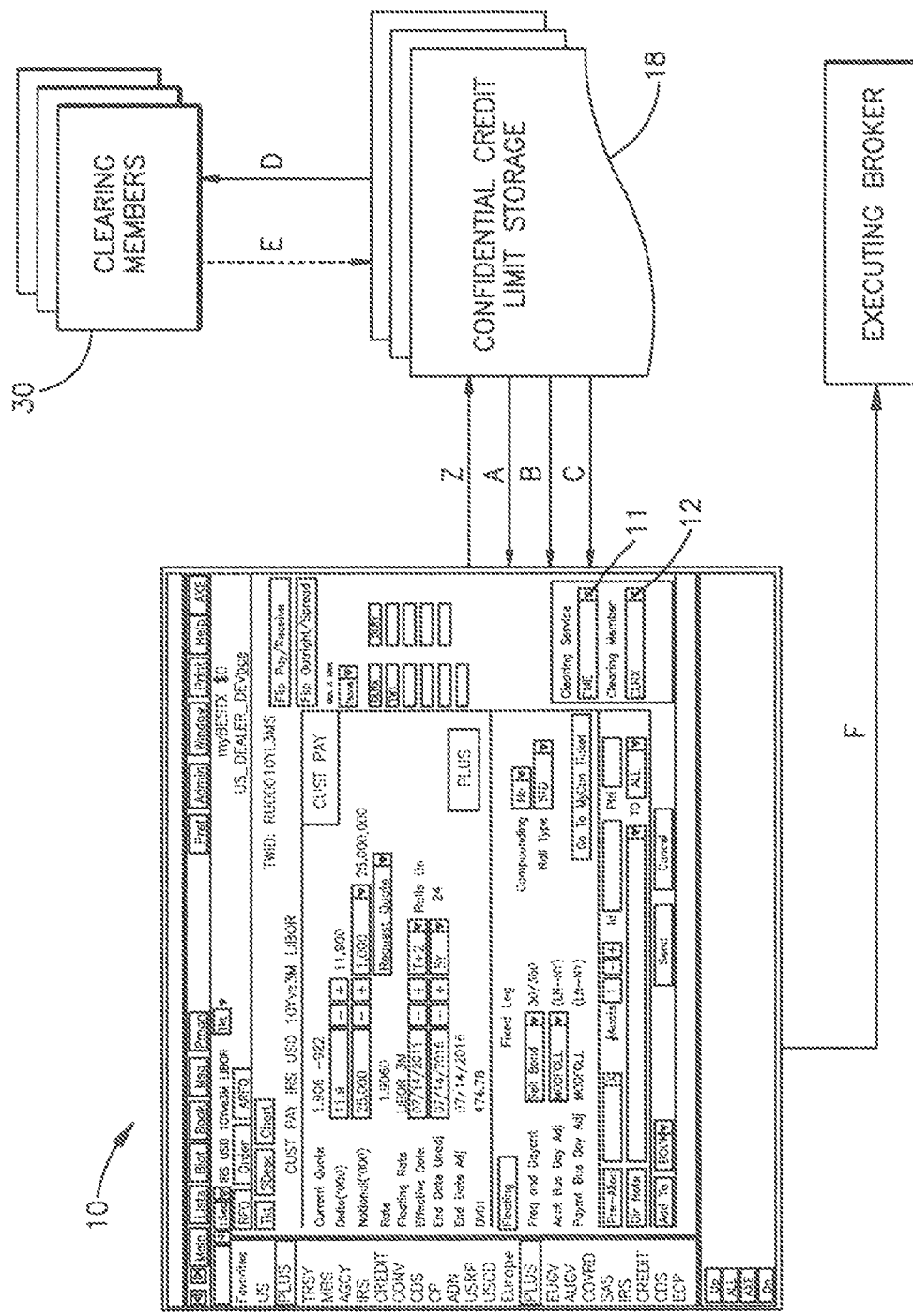
FIG. 2 is a flow diagram depicting an exemplary workflow for determining certainty of clearing.

An overview of an embodiment of the workflow for determining certainty of clearing is shown in FIG. 2. A customer 20 using trading platform 10 can enter in a trade order and select a clearing service and/or clearing member from clearing service field 11 and clearing member field 12. Preferably, the trading platform 10 receives clearing data from a Clearing Member 30 for each account enabled with such Clearing Member 30 and a database 18, which may include storage area for confidential credit limit data, is populated with a predetermined level of credit based on the clearing data (arrow E). The customer 20 can request clearing certainty and the customer's trade order details and/or customer details can be checked against the data in the database 18 (arrow Z). The clearing certainty can be approved (arrow A), rejected (arrow B), or pending (arrow C) based on the data in the database 18, which may include credit limit data. The level of credit for any particular account does not necessarily represent the account's total credit and the credit level may be set to zero or some other predetermined amount. The level of credit may also change from time to time (e.g., day to day or intraday). In one embodiment, such changes would preferably be enacted on a real-time, or substantially real-time, basis. The clearing data and credit limits are preferably confidentially stored on the database 18. When certain tolerance levels are reached, additional credit may be requested from the clearing member 30 (arrow D). Once the credit check is complete, the trade order can be sent to an executing broker, preferably along with a certainty of clearing status notification (arrow F).

The trading platform 10 determines whether certainty of clearing is provided based on the clearing data and credit limits, which may be based, in part or in whole, on credit risks and/or deductions from credit limits. In an embodiment, the trading platform 10 is preferably capable of calculating credit risks and/or deduction from credit limits. Such calculations may be based on a DV01 and/or net present value (NPV) or other approaches that are readily apparent to one of ordinary skill in the art (e.g., "notional", "initial margin", and "CS01" calculation methods). A calculation based on the DV01 algorithm or the NPV values preferably includes per currency and aggregate limits and may need to be broken down by tenor. Calculations may also be based on both of the foregoing methods and/or other methods/algorithms known or later developed.

The risk calculation and/or deduction from credit limits preferably accounts for one or more of the following factors:
(1) Directional limits—limits may be based on a daily portfolio and/or individual trade basis;
(2) Trade size limits—limits may be set to restrict trades greater than a certain size;
(3) Tenor cap—limits may be set to restrict trades above a certain tenor;
(4) Curve risk limits—limits may be defined by the Clearing Members 30 or based on the following 3 buckets:
 a. ≤2 years
 b. 2-10 years
 c. ≥10 years
(5) Currency limits—limits may be in place for individual currencies and/or across all currencies. The calculation of this limit will incorporate a Foreign Exchange ("FX") component to convert trades done in other currencies into the master currency in which the overall limit is denominated based on daily-reset indicative exchange rates.

In another embodiment, the trading platform 10 may provide a mechanism that permits Clearing Members 30 to automatically approve credit inquiries for certain customers 20. The trading platform 10 may permit Clearing Members 30 to specify certain firms that are permitted to bypass the credit check, thus allowing accounts affiliated with such firms to trade indefinitely. The trading platform 10 preferably permits such credit bypass permission to be granted on a firm level as well as an account level.

Shown in FIGS. 3-8 are exemplary embodiments of graphical user interfaces (GUI) for requesting clearing certainty.

In exemplary embodiments, customers may also set certain limits on clearing certainty requests. For example, FIGS. 5-8 are screen shots of exemplary embodiments of a limit input screen 40. In an exemplary embodiment, with reference to FIG. 6, limit data may be input into any or all of the input fields 50 (or any combination thereof) provided in the GUI. Preferably, limits may be input manually via the GUI, via bulk upload (for example, through spreadsheets (such as Excel spreadsheets) and/or other data management tools or applications now known or later developed), or via API.

Figure 6:
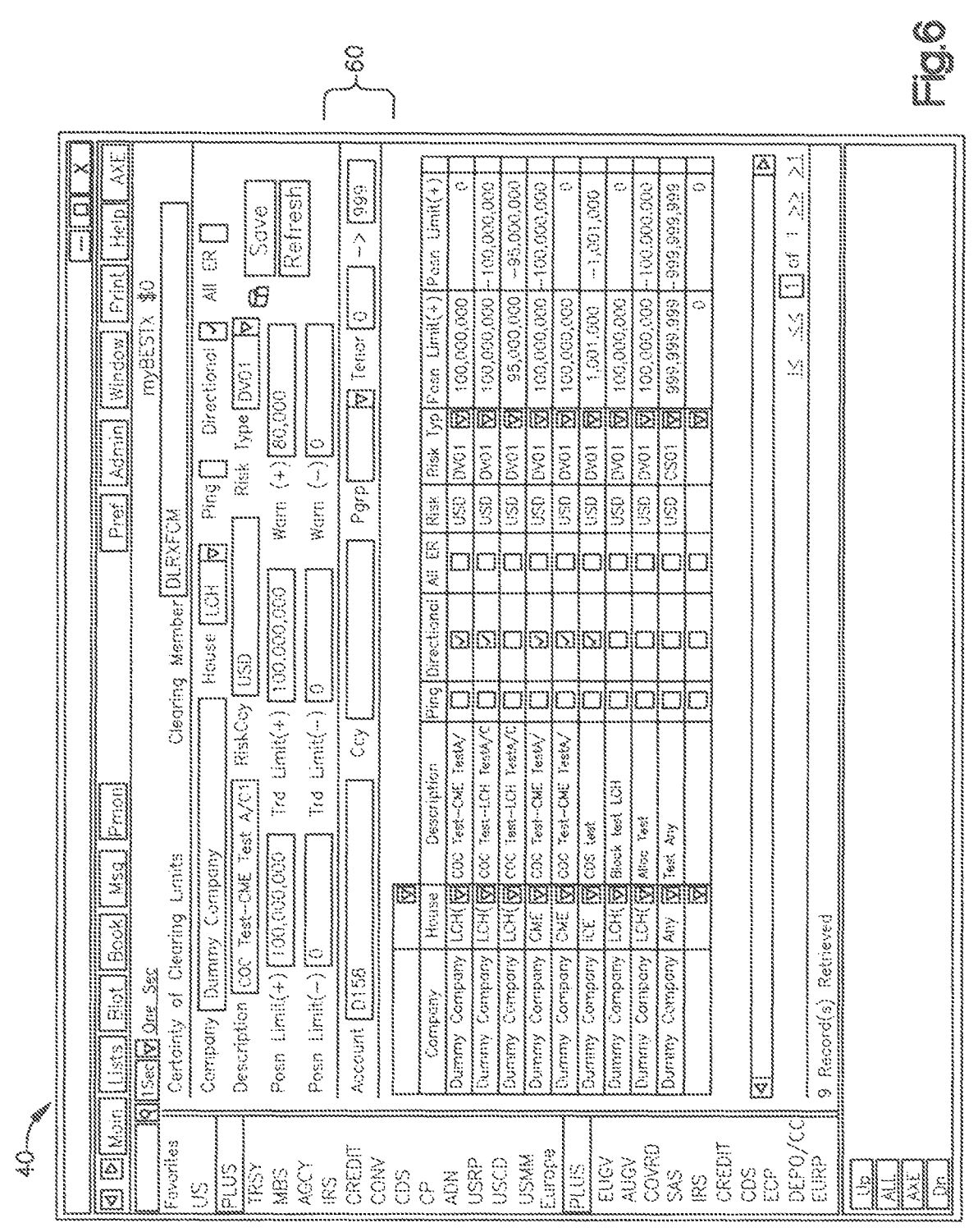

As shown in FIG. 6, matching fields 60 may be populated in the GUI as well. These matching fields 60 permit greater granularity of limit data by allowing the user to ascribe limits only to certain inputs or permutations of inputs in the matching fields. For example, inputting a certain currency into the CCY field would result in any limit data applying only to that specific currency. Likewise, limits can be configured to apply only to a certain sub-account, product group, or tenor range.

Figure 7:
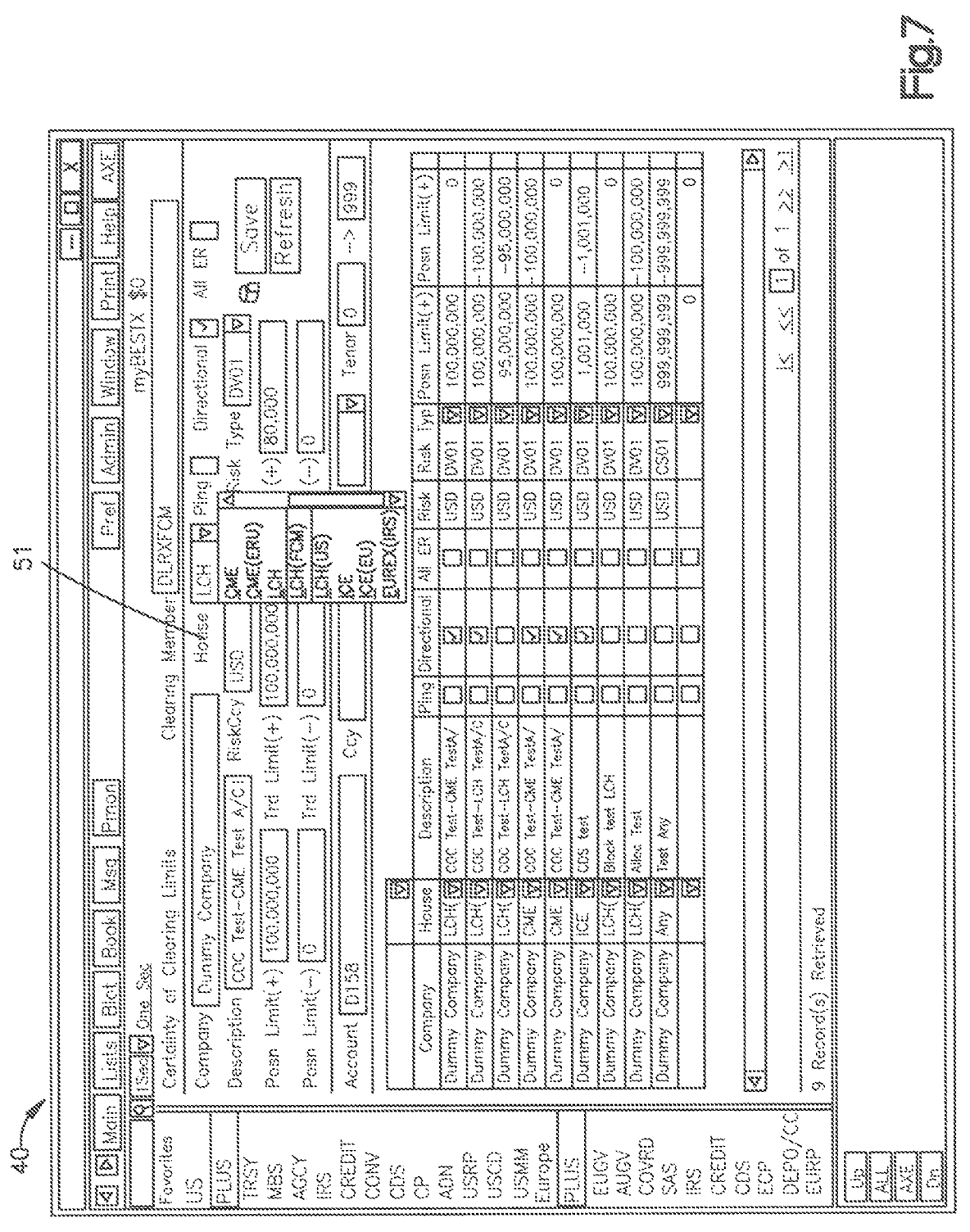

In an exemplary embodiment, with reference to FIG. 7, a house field 51 may be provided on the limit input screen. Using the house field 51, limit data may be specified for a specific clearing house. Limit data may also be set to apply across all clearing houses.

Figure 8:
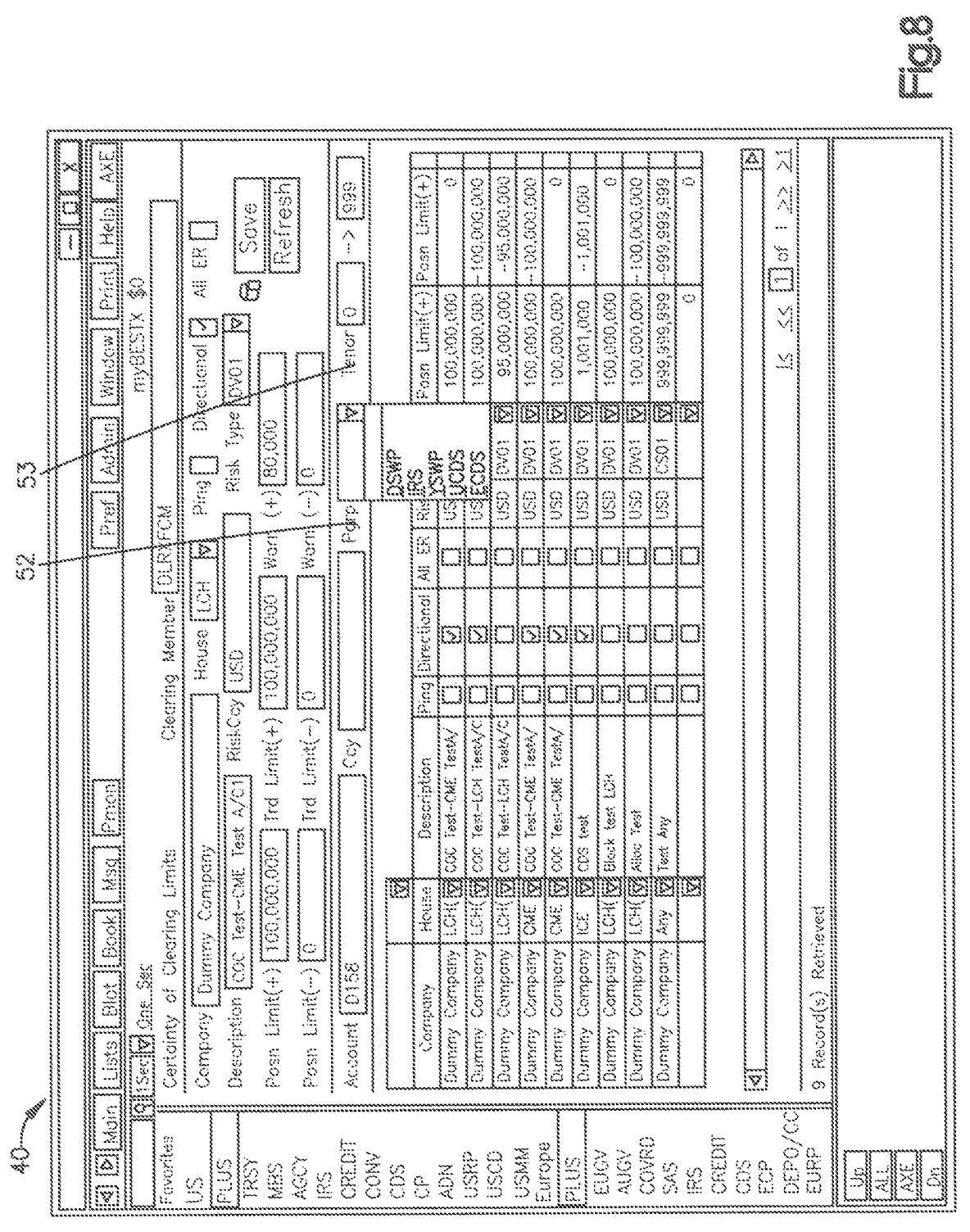

In an exemplary embodiment, with reference to FIG. 8, a products group field 52 may be provided on the limit input screen. The products group field 52 permits limit data to be applied to a specific product group. Limit data may also be set to apply across all products. A tenor field 53 may also be provided. The tenor field 53 permits limit data to be broken down into specific tenor ranges.

While a Clearing Member 30 may provide clearing data, it is not necessary for the trading platform 10 to receive such data. In another embodiment, Clearing Members 30 may provide no clearing data, in which case the trading platform 10 will seek credit approval from the Clearing Members 30 at the time of a trade. Additionally, in the event a credit level is set to zero, the trading platform 10 will also seek credit approval at the time of a trade.

In exemplary embodiments, a trade ticket GUI 70 may be provided for a customer 20 to enter in data for a request for clearing certainty. In an exemplary embodiment, with reference to FIGS. 3-4, a user may enter information pertaining to an RFQ in the trading platform 10 under the RFQ tab 110. The user may select one or more clearing members 30 using the "Clearing" field 140. Some customers may be required to preallocate at this stage (i.e., designate the subaccounts amongst which a given block trade will be divided). Once the user inputs sufficient information relating to an RFQ, the user may click on the "Chk Certainty" button 100, which causes the trading platform 10 to determine whether certainty of clearing is provided (as further discussed below). The result of such determination is provided in the interface. For example, if clearing certainty is not provided (which may be the case where there is insufficient credit, where the credit was preset to zero, where no level of credit is set, or where there is insufficient clearing data provided, as discussed above), the user may be notified by a "Not Certain" button 130. The trade (and in some embodiments, along with notification of clearing certainty or lack of clearing certainty) may be sent to the executing broker using the "Send" button 120.

Figure 9:
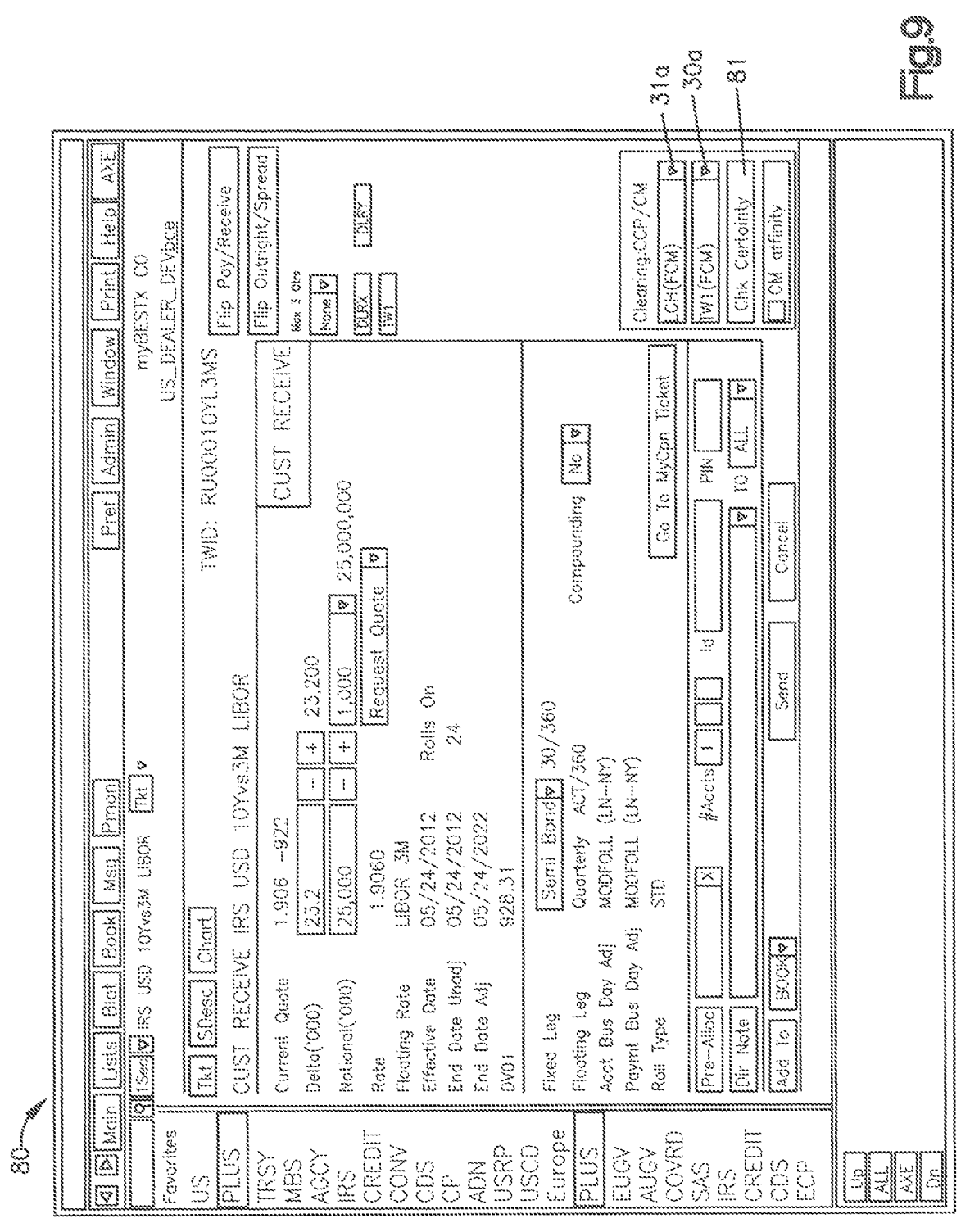

Trade ticket GUI's 70 may be configured for different types of trades. For example, a GUI may be provided specifically for dollar swaps. FIG. 9 shows an exemplary embodiment of a dollar swap ticket GUI 80. Similar to the process describe above, at the time of a trade, the customer 20 chooses one or more clearing services 31 in the clearing service field 31a and one or more Clearing Members 30 in the clearing member field 30a in the dollar swap ticket GUI 80. Some customers 20 may be required to preallocate by the Clearing Member 30 at this stage (i.e., designate the subaccounts amongst which a given block trade will be divided). Once the customer 20 inputs sufficient information relating to an RFQ, the user may click on the "Chk Certainty" button 81, which causes the trading platform 10 to determine whether certainty of clearing is provided in accordance with the methods and systems described herein.

Figure 10:
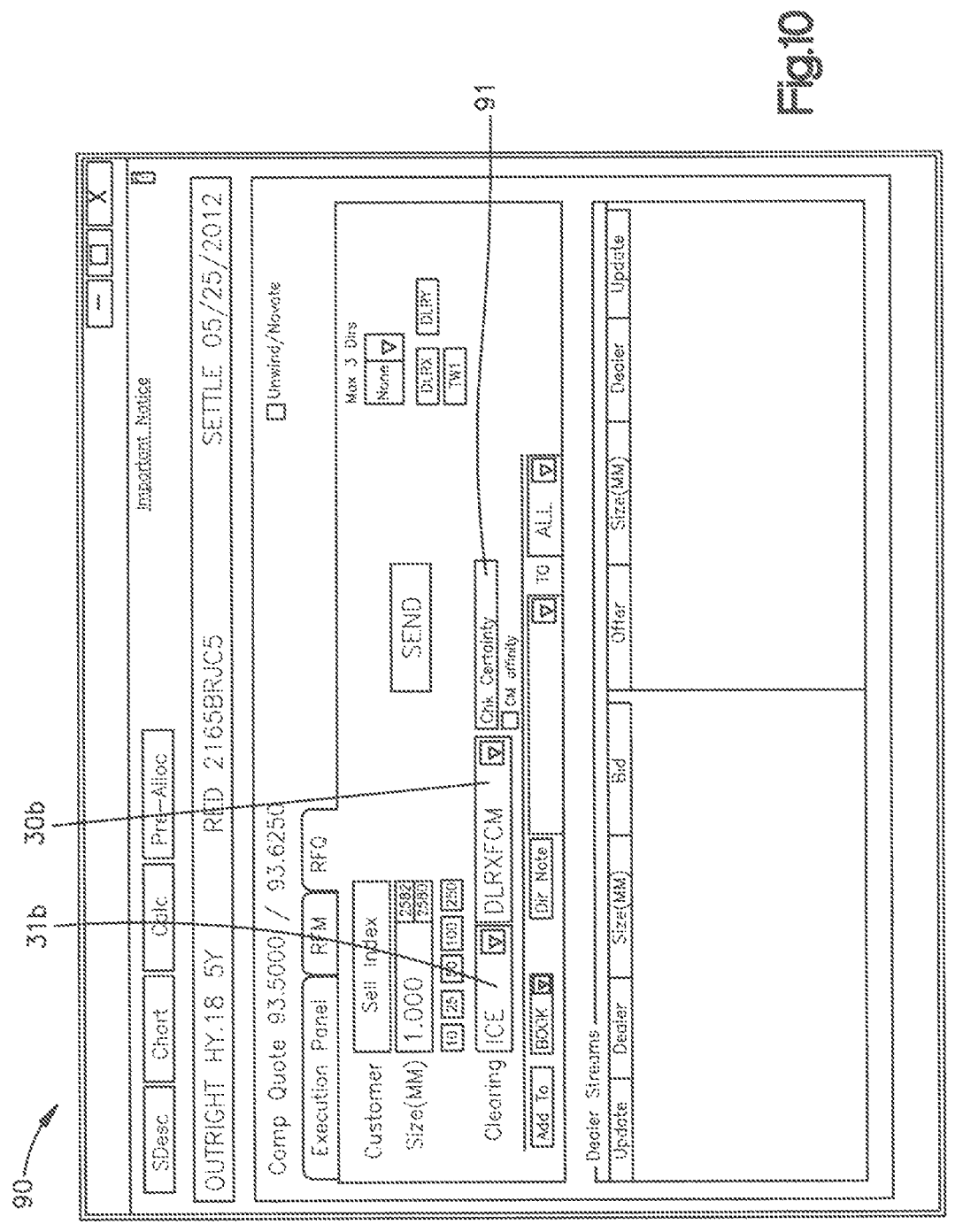

In another exemplary embodiment, with reference on FIG. 10, a CDS GUI 90 may be provided for credit default swaps (CDS). Similar to the process described above, at the time of a trade, the customer 20 chooses one or more clearing services 31 in the clearing service field 31b and one or more Clearing Members 30 from the clearing member field 30b in the CDS GUI 90. Some customers 20 may be required to preallocate by the Clearing member 30b at this stage (i.e., designate the subaccounts amongst which a given block trade will be divided). Once the customer 20 inputs sufficient information relating to an RFQ, the user may click on the "Chk Certainty" button 91, which causes the trading platform 10 to determine whether certainty of clearing is provided in accordance with the methods and systems described herein.

In an exemplary embodiment, the trading platform 10 preferably provides a mechanism that permits customers 20 to allow a designation of different Clearing Members 30 based upon the different executing brokers in the same trade inquiry on the trade ticket GUI 70, dollar swap ticket GUI 80, or CDS GUI 90 (or any other GUI providing the same or similar functionality) such that the Clearing Member 30 and its respective executing broker will be members of the same parent entity. In this manner the trading platform 10 is able to take advantage of the cost advantages of utilizing a Clearing Member 30 who is within the same entity as the executing broker. This may be done, for example, when a client has more than one Clearing Member 30 enabled per Clearing Service 31 and more than one executing broker selected in the request for quotation (RFQ). As the final selection of Clearing Member 30 depends on the dealer who wins the trade, a credit check must be performed with every Clearing Member 30 on an RFQ. In another embodiment, the trading platform 10 may provide a mechanism for the customer 20 to override sending different Clearing Members 30 to different executing brokers and instead, permitting the customer 20 to select only a single Clearing Member 30 to be sent to all executing brokers in the RFQ.

When a clearing certainty check is requested, for instance by the customer 20 pushing "Chk Certainty" button 100 on the trade ticket GUI 70 (or "Chk Certainty" button 81, 91 on the dollar swap ticket GUI 80 or CDS GUI 90 or any other similar button on any other GUI providing the same or similar functionality), the trading platform 10 checks the credit required to execute the trade against the credit limit allocated to the particular customer's account and sends the executing broker a "Certainty of Clearing" status notification, e.g., a message indicating whether the Clearing Member 30 has provided certainty of clearing. In this regard, if the trading platform 10 determines that there is sufficient credit, it provides an indication of clearing certainty. The trading platform 10 then sends the trade to the executing broker with a message stating clearing has been approved by the Clearing Member 30. If, however, the trading platform 10 determines that there is insufficient credit, or if the credit limit had been set to zero, or if the Clearing Member 30 has elected to receive consent request prior to each trade, the trading platform 10 sends a message to the Clearing Member 30 requesting consent for clearing certainty or transmission of additional credit. If sufficient credit is received or if consent for clearing certainty is granted, the trading platform 10 provides an indication of clearing certainty. If the Clearing Member 30 rejects a trade, the trading platform 10 preferably does not block the trade from being sent to the executing broker. Rather, the trading platform 10 preferably provides an indication that there is no clearing certainty, at which point the customer 20 user may elect to send the trade to the executing broker with a Certainty of Clearing status notification indicating that no clearing approval has been received.

Preferably, in embodiments where a trade has been preallocated, the trading platform 10 indicates to the customer 20 user that clearing certainty has been granted, at which point the customer 20 may elect to send the trade to the executing broker with a Certainty of Clearing status notification indicating that clearing certainty has been provided by the Clearing Member 30 only if all allocations are approved by the Clearing Member 30. If some allocations have not been approved by any of their enabled Clearing members 30, the trading platform 10 preferably indicates to the customer 20 that clearing certainty has not been granted, at which point the customer 20 may elect to send the trade to the executing broker with a Certainty of Clearing status notification indicating that certainty of clearing has not been provided by the Clearing Members 30.

Over the lifecycle of the trade process, the trading platform 10 transmits trade status message to the selected Clearing member 30 (e.g., open, executed, cleared, etc.), preferably in real time (or close thereto), so that the Clearing Member 30 may adjust internal limits and/or risk measurements accordingly.

More specifically, in an embodiment, the trading platform 10 engages in a credit limit consent request negotiation based on the standard FpML consent request negotiation model which consists, for example, of "requestConsent", "requestConsentRetracted", "consentAcknowledgement", "consentException", "consentGranted" and "consentRefused" messages. The trading platform 10 implements the negotiation process by extending the "additionEvent" in the Event.Model element, which is part of the standard FpML consent negotiation work flow.

Figure 11:
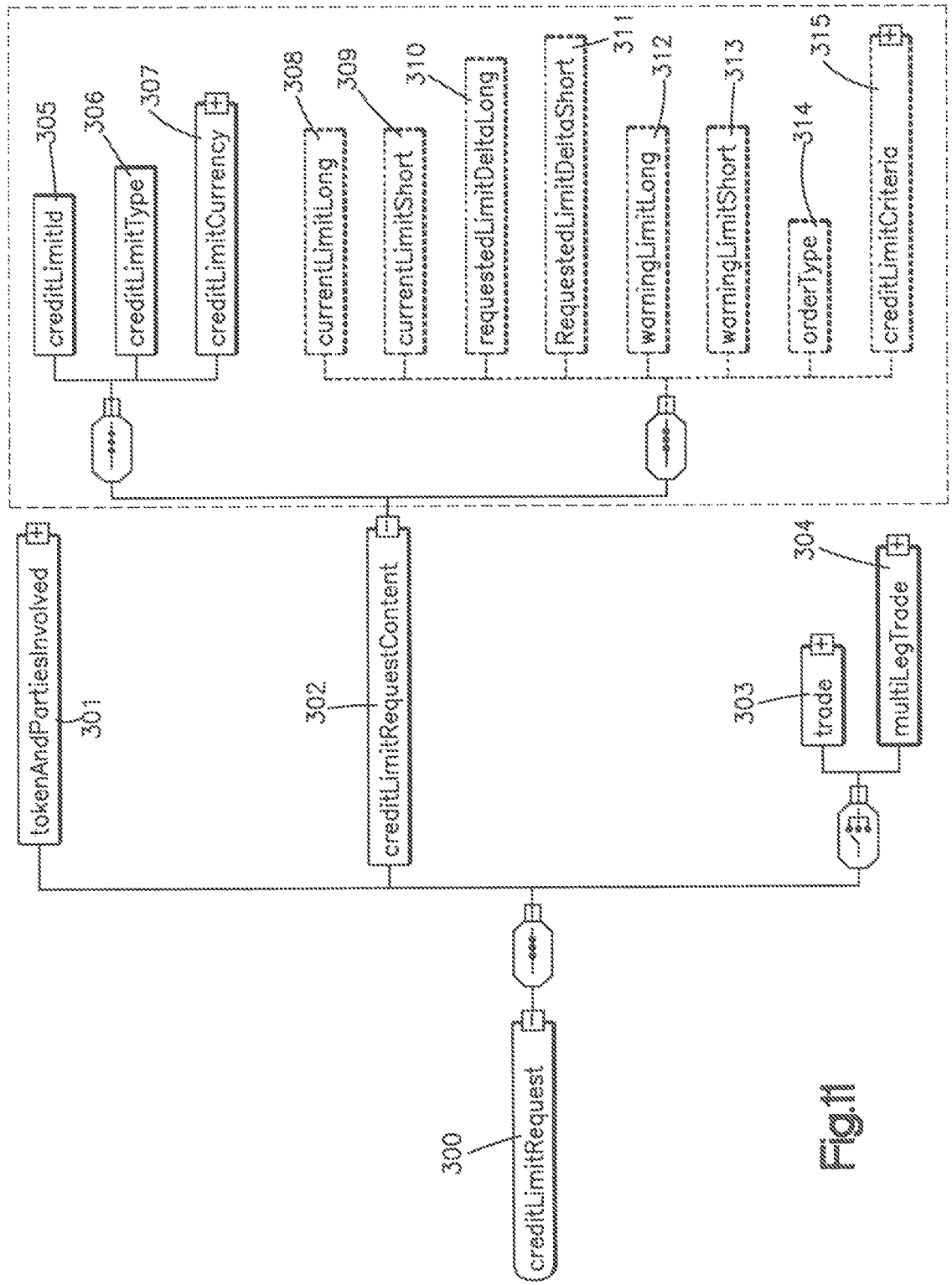
FIG. 11 is a flow diagram depicting an exemplary workflow for a credit limit request event.
Figure 12:
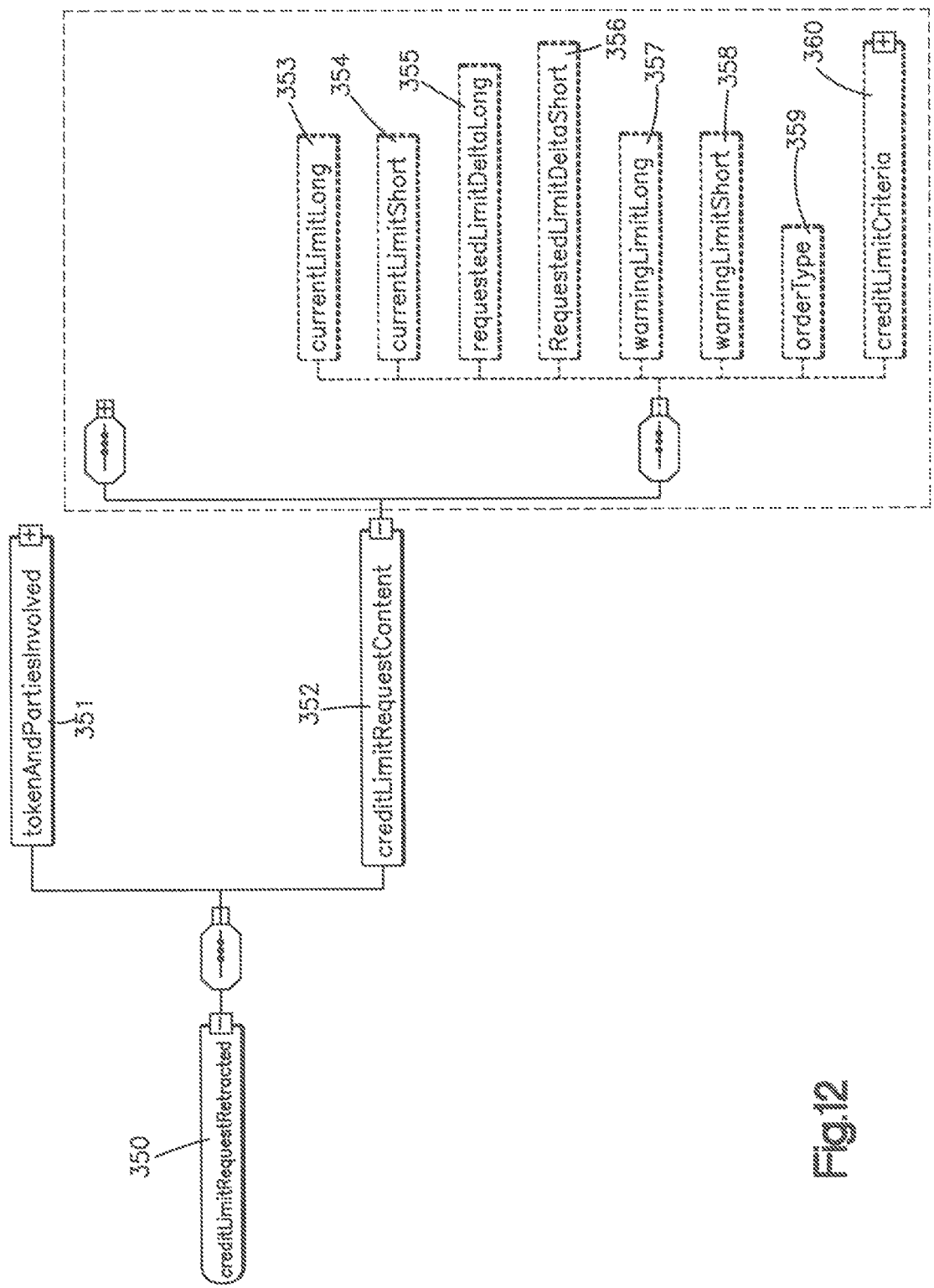
FIG. 12 is a flow diagram depicting an exemplary workflow for a credit limit request retracted event.
Figure 13:
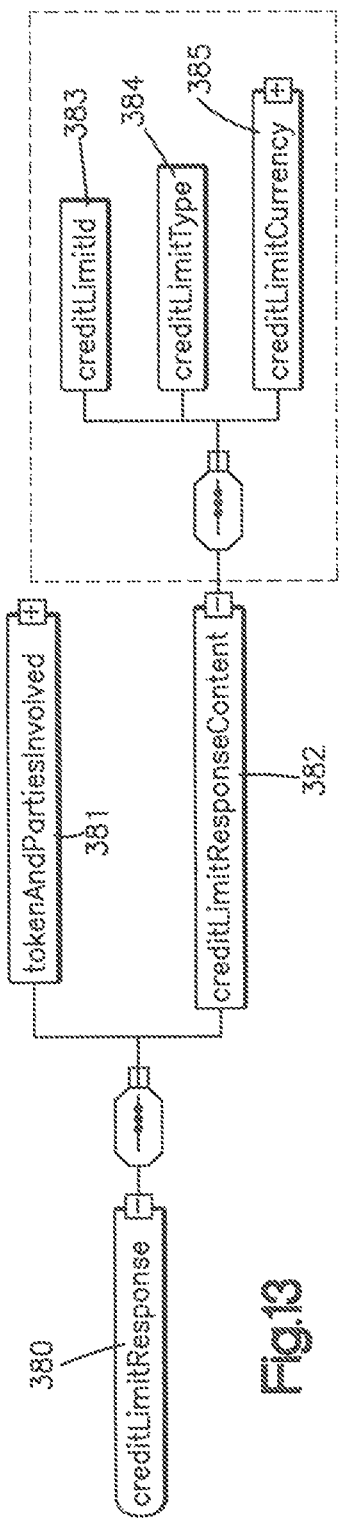
FIG. 13 is a flow diagram depicting an exemplary workflow for a credit limit response event.

In one embodiment, with reference to FIGS. 11-13, the "additionalEvent" component preferably includes the following three event components to support the negotiation flow:

(1) CreditLimitRequest, which is preferably used by the trading platform 10 in the "requestConsent" message when making a credit limit request to a clearing member 30 (see FIG. 11).

(2) CreditLimitRequestRetracted, which is preferably used by the trading platform 10 in the "requestConsentRetracted" message when attempting to rollback the consent request (see FIG. 12).

(3) CreditLimitResponse, which is preferably received by the trading platform 10 from the Clearing Member 30 in the "consentGranted" or "consentRefused" message as a response to the "requestConsent" message (see FIG. 13).

With reference to FIG. 11, in an exemplary embodiment, the CreditLimitRequest event component 300 is a credit limit request event extending fpml: AdditionalEvent to be used in the FpML consent message flow. It is preferably used in the requestConsent message. The CreditLimitRequest event component 300 includes a tokenAndPartiesInvolved sub-component 301, and creditLimitRequestConsent sub-component 302, a trade sub-component 303, and a multiLegTrade 304 sub-component. The tokenAndPartiesInvolved sub-component 301 may include a credit limit token id and information pertaining to parties involved. The creditLimitRequestConsent sub-component 302 may repeat for multiple credit limit associated to the trade. The trade sub-component 303 may be directed to an outright or single leg trade. The multiLegTrade 304 sub-component may be directed to multileg trades.

The creditLimitRequestConsent sub-component 302 may include further sub-components, including without limitation (or any of the other sub-components described herein):

creditLimitId sub-component 305, which may be the meaningful unique name of the credit limit associated to a clearing member, which may usually be the combination of the clearing member's name and a buy-side organization's name;

creditLimitType sub-component 306, which may be DV01 or NPV;

creditLimitCurrency sub-component 307, which includes the currency of the credit limit;

currentLimitLong sub-component 308, which may include the current credit limit (preferably an absolute number) on the long side;

creditLimitShort sub-component 309, which may include the current credit limit (preferably an absolute number) on the short side;

requestedLimitDeltaLong sub-component 310, which may be the delta (increment or decrement +/−) of requested limit on the long side;

requestedLimitDeltaShort sub-component 311, which may be the delta (increment or decrement +/−) of requested limit on the short side;

warningLimitLong sub-component 312, which may be called if the request is a warning on the long side;

warningLimitShort sub-component 313, which may be called if the request is a warning on the short side;

orderType sub-component 314, which may indicate the type of order, such as Limit order for IRS;

creditLimitCriteria sub-component 315, which may include the credit limit criteria;

With reference to FIG. 12, an exemplary embodiment of the CreditLimitRequestRetracted event component 350 may include a tokenAndPartiesInvolved sub-component 351 and a creditLimitRequestContent sub-component 352. The CreditLimitRequestRetracted event component 350 is preferably a credit limit request retracted event extending fpml: AddionalEvent to be used in the FpML consent message flow. It is preferably used in the requestConsentRetracted message. The tokenAndPartiesInvolved sub-component 351 may include a credit limit token id and information relating to the parties involved. The creditLimitRequestContent sub-component 352 is preferably repeated for multiple credit limits associated to the trade.

The creditLimitRequestContent sub-component 352 preferably includes further sub-components, including without limitation (or any of the other sub-components described herein):

currentLimitLong sub-component 353, which may include the current credit limit (preferably an absolute number) on the long side;

creditLimitShort sub-component 354, which may include the current credit limit (preferably an absolute number) on the short side;

requestedLimitDeltaLong sub-component 355, which may be the delta (increment or decrement +/−) of requested limit on the long side;

requestedLimitDeltaShort sub-component 356, which may be the delta (increment or decrement +/−) of requested limit on the short side;

warningLimitLong sub-component 357, which may be called if the request is a warning on the long side;

warningLimitShort sub-component 358, which may be called if the request is a warning on the short side;

orderType sub-component 359, which may indicate the type of order, such as Limit order for IRS;

creditLimitCriteria sub-component 360, which may include the credit limit criteria;

With reference to FIG. 13, an exemplary embodiment of the CreditLimitResponse event component 380 may include a tokenAndPartiesInvolved sub-component 381 and a creditLimitResponseContent sub-component 382. The CreditLimitResponse event component 380 is preferably a credit limit request retracted event extending fpml: AdditionalEvent to be used in the FpML consent message flow. It is preferably used in the consentGranted or consentRefused messages coming from the clearing member in response to the credit limit request for consent. The tokenAndPartiesInvolved sub-component 381 may include a credit limit token id and information relating to the parties involved. The creditLimitResponseContent sub-component 382 is preferably repeats for multiple credit limits associated to the trade.

The creditLimitResponseContent sub-component 382 preferably includes further sub-components, including without limitation (or any of the other sub-components descried herein):

- creditLimitId sub-component 383, which may be the meaningful unique name of the credit limit associated to a clearing member, which may usually be the combination of the clearing member's name and a buy-side organization's name;
- creditLimitType sub-component 384, which may be DV01 or NPV;
- creditLimitCurrency sub-component 385, which includes the currency of the credit limit;

With reference to FIGS. 14-22, supporting elements, components, and/or sub-components to the above-referenced event components may also be included in the trading platform 10. This may include a "TokenAndPartiesInvolved", "CreditLimitBaseContent", "CreditLimitCriteria", "RequestConsent", "RequestConsentRetracted", "ConsentGranted", "CorrectableRequestMessage", "ResponseMessage", and "NonCorrectableRequestMessage" messages and/or events.

Figure 14:
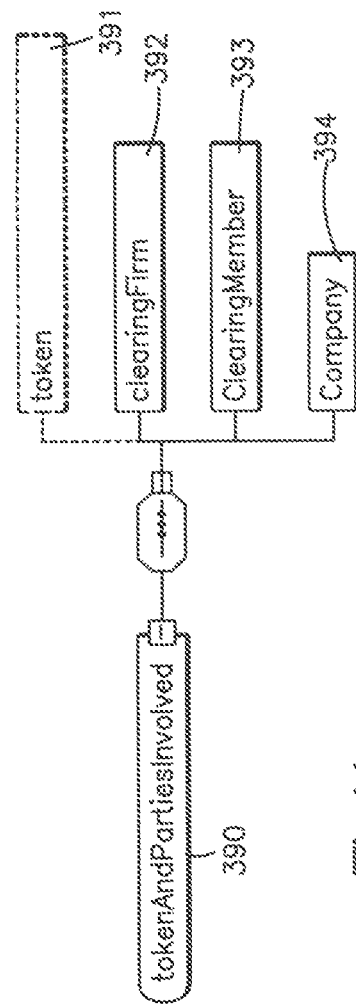
FIG. 14 is a flow diagram depicting an exemplary workflow for tokens and parties involved event.

The "TokenAndPartiesInvolved" event identifies the Token ID as well as the Clearing House, Clearing Member, and Company involved in the request. With reference to FIG. 14, an exemplary embodiment of the TokenAndPartiesInvolved event 390 may include the credit limit token id and information relating to the parties involved. The TokenAndPartiesInvolved event 390 may further include sub-components including without limitation (or any of the other sub-components described herein):

- token sub-component 391, which may include the credit limit token if originated from the platform (e.g., trading platform 10) or in response to request from the platform, such as trading platform 10;
- clearingFirm sub-component 392, which may be the clearing house ID;
- clearingMember sub-component 393, which may be the clearing member ID;
- company sub-component 394, and may be the buy-side company name.

Figure 15:
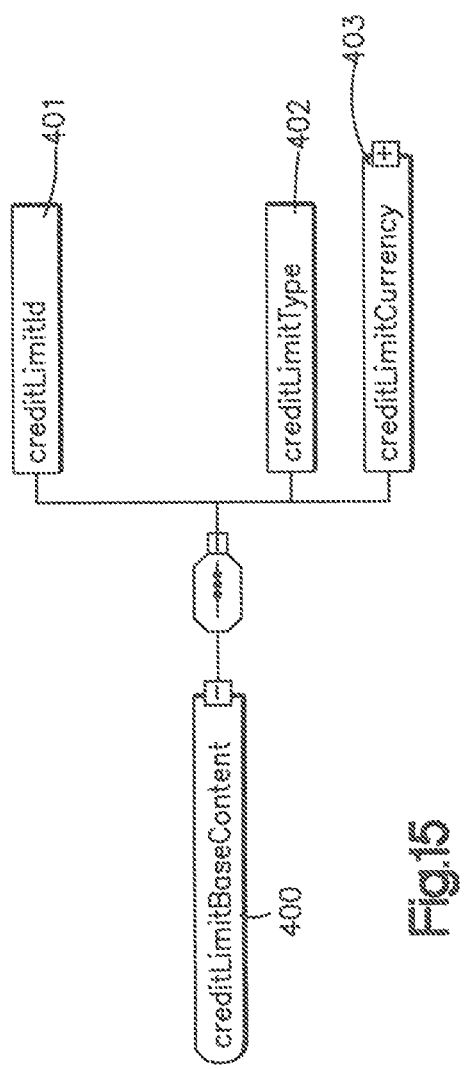
FIG. 15 is a flow diagram depicting an exemplary workflow for a credit limit base content event.
Figure 16:
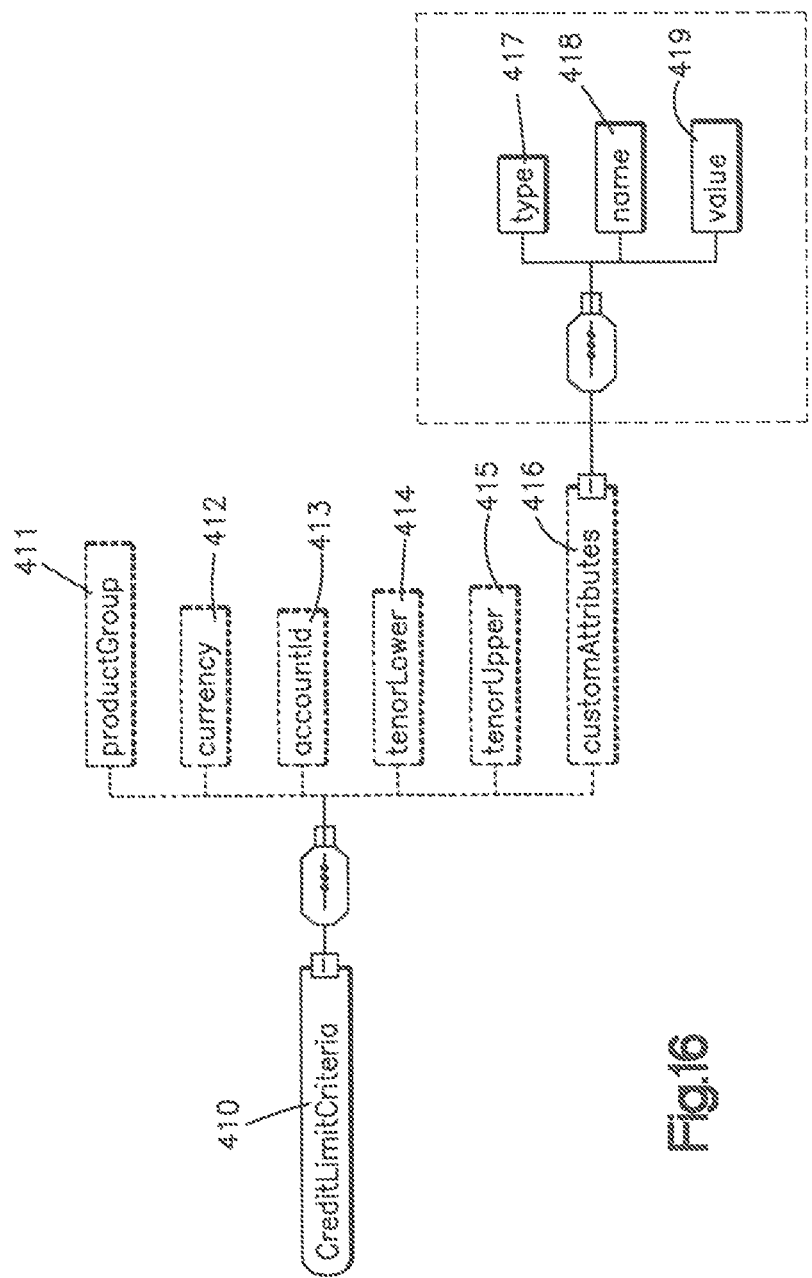
FIG. 16 is a flow diagram depicting an exemplary workflow for a credit limit criteria event.

"CreditLimitBaseContent" identifies the currency and denomination of the credit limit, as well as a unique identifier for that particular limit which incorporates the Clearing Member and Company involved in the request. With reference to FIG. 15, an exemplary embodiment of the CreditLimitBaseContent event 400 may include the credit limit base content. The CreditLimitBaseContent event 400 may further include sub-components including without limitation (or any of the other sub-components described herein):

- creditLimitId sub-component 401, which ma be the meaningful unique name of the credit limit associated to a clearing member, which may usually be the combination of the clearing member's name and a buy-side organization's name;
- creditLimitType sub-component 402, which may be DV01 or NPV;
- creditLimitCurrency sub-component 403, which includes the currency of the credit limit;

"CreditLimitCriteria" identifies any matching fields associated with that particular request. With reference to FIG. 16, an exemplary embodiment of the CreditLimitCriteria event 410 may include the credit limit criteria. The CreditLimitCriteria event 410 may further include sub-components including without limitation (or any of the other sub-components described herein):

- productsGroup sub-component 411, which may include information about platform product groups;
- currency sub-component 412, which may be the currency for matching criteria;
- accountId sub-component 413, which may be the account ID;
- tenorLower sub-component 414, which is preferably the lower tenor (inclusive), such as 2Y;
- tenorUpper sub-component 415, which is preferably the upper tenor (inclusive), such as 10Y; and
- customAttributes sub-component 416, which may include additional non-standard attributes of credit limit criteria. This sub-component may include even further sub-components, including without limitation (or any of the other sub-components described herein):
  - type sub-component 417, which may indicate the data type;
  - name sub-component 418, which may be the name of the data; and
  - value sub-component 419, which may be the value of the data.

Figure 17:
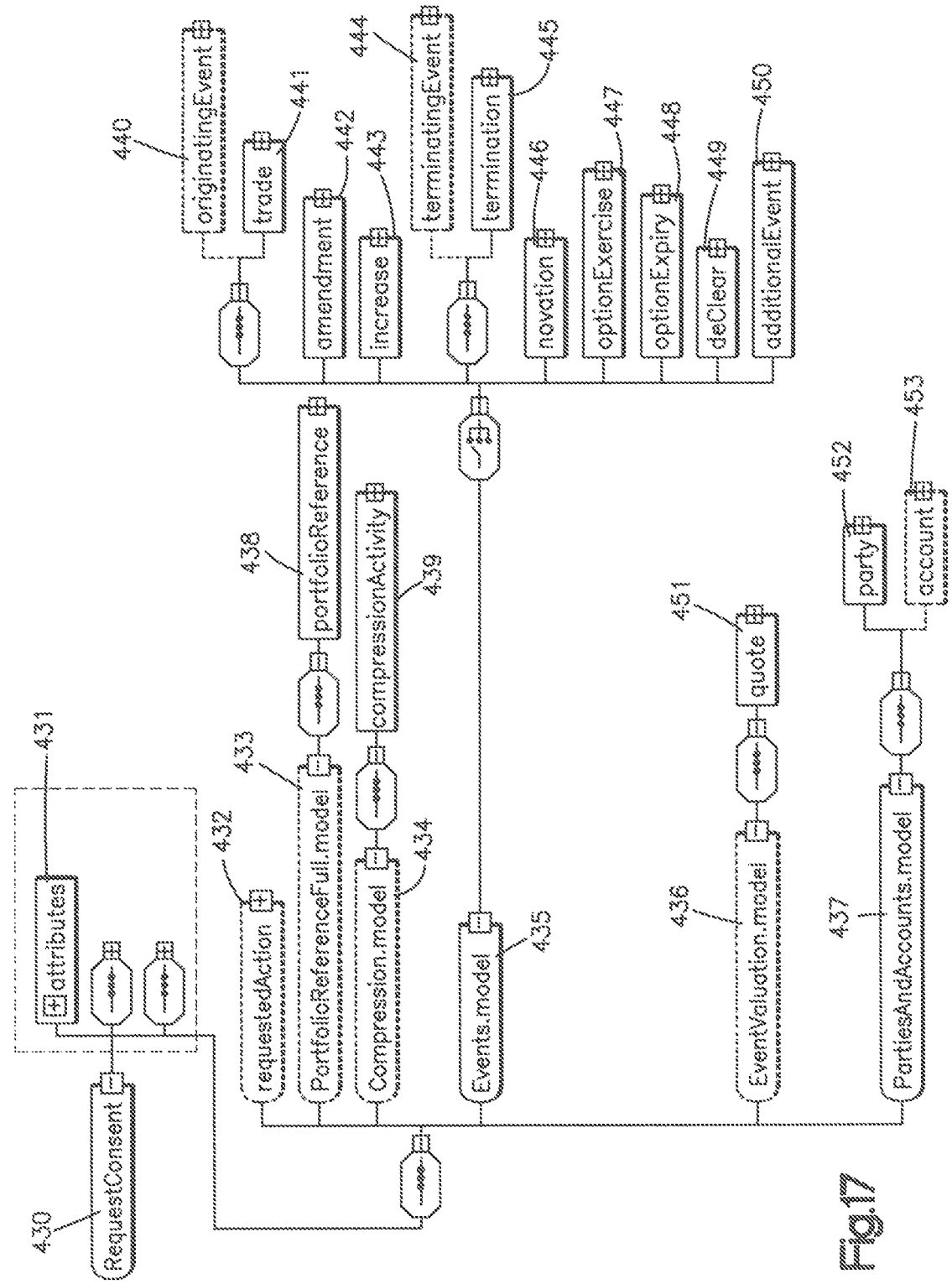
FIG. 17 is a flow diagram depicting an exemplary workflow for a request consent event.

"RequestConsent" conveys to the Clearing member the information required for that Clearing Member to make a decision about whether to extend credit for that particular trade. With reference to FIG. 17, an exemplary embodiment of the RequestConsent event 430 may include sub-components including without limitation (or any of the other sub-components described herein):

- attributes sub-component 431, which may be part of a correctableRequestMessage (extension) event;
- requestedAction sub-component 432, which may include the reason the consent was requested;
- PortfolioReferenceFullmodel sub-component 433, which may define a model group that allows a portfolio reference request structure to be included in a message and may include further sub-components to effect this feature, such as portfolioReference sub-component 438;
- Compression.model sub-component 434, which may be a model group holding information about compressions affecting a trade/event and may include further sub-components to effect this feature, such as compressionActivity sub-component 439, which may include the compression information for the trade;
- Events.model sub-component 435, which may include a choice between a trade and a post-trade event and may include further sub-components to effect this feature, such as
  - OriginatingEvent sub-component 440;
  - Trade sub-component 441;
  - Amendment sub-component 442;
  - Increase sub-component 443;
  - terminatingEvent sub-component 444;
  - termination sub-component 445;
  - novation sub-component 446;
  - optionExercise sub-component 447;
  - optionExpiry sub-component 448;
  - deClear sub-component 449; and
  - additionalEvent sub-component 450, which may be an extension/substitution point to customize FpML and add additional events
- EventValuation.model sub-component 436, which may be a model group holding valuation information for an event and may include further sub-components to effect this feature, such as quote sub-component 451, which may include pricing information for the trade; and PartiesAndAccounts.model sub-component 437, which may include information about supporting parties and account definitions and may include further sub-components, such as party sub-component 452, which may include a legal entity or a subdivision of a legal entity, and account sub-component 453.

Figure 18:
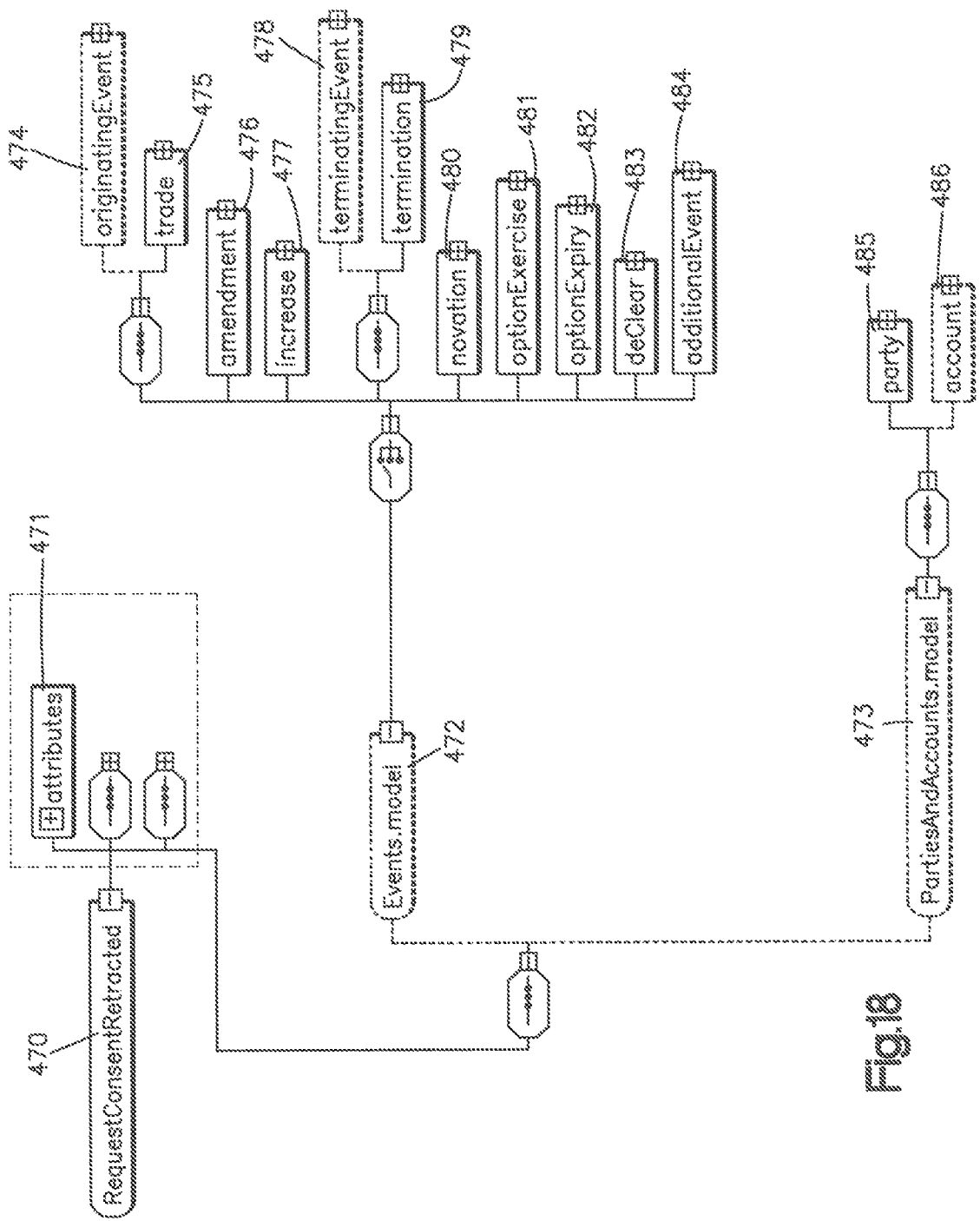
FIG. 18 is a flow diagram depicting an exemplary workflow for a request consent retracted event.

"RequestConsentRetracted" is a message sent to the Clearing Member to rescind the request for credit, for example due to the Company opting not to execute the trade. With reference to FIG. 18, an exemplary embodiment of a RequestConsentRetracted event 470 may include a NonCorrectableRequestMessage (extension) event, which may include attributes sub-component 471, and Events.model sub-component 472 and PartiesAndAccounts.model sub-component 473.

The Events.model sub-component 472, which may include a choice between a trade and post-trade event and may further include the following sub-components:
- originating Event sub-component 474;
- trade sub-component 475;
- amendment sub-component 476;
- increase sub-component 477;
- terminatingEvent sub-component 478;
- termination sub-component 479;
- novation sub-component 480;
- optionExercise sub-component 481;
- optionExpiry sub-component 482;
- deClear sub-component 483;
- additionalEvent sub-component 484, which may include an additionalEvent element that is an extension/substitution point to customize FpML and add additional events;

The PartiesAndAccounts.model sub-component 473 may include formation relating to supporting parties and account definitions and further include a party sub-component 485, which may be a legal entity or a subdivision of a legal entity, and an account sub-component 486, which may include optional account information used to precisely define the origination and destination of financial instruments.

Figure 19:
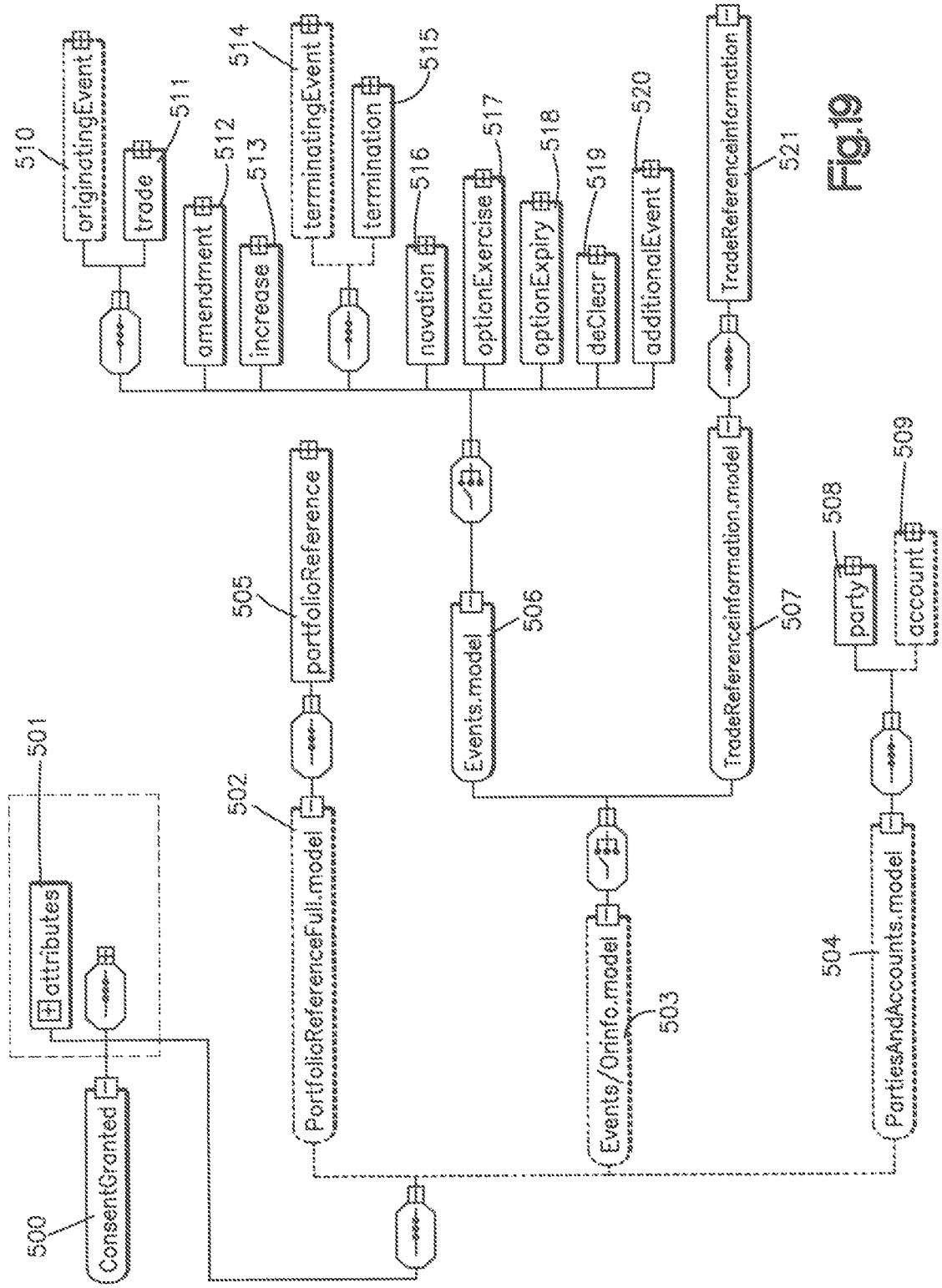
FIG. 19 is a flow diagram depicting an exemplary workflow for a consent granted event.

"ConsentGranted" is a message sent from the Clearing Member to the trading platform 10 to indicate that there is sufficient credit for that particular trade. With reference to FIG. 19, an embodiment of a ConsentGranted sub-component 500 may include an attributes sub-component 501, which may be part of a responseMessage (extension) event. The ConsentGranted sub-component 500 may further include:
  PortfolioReference.model sub-component 502, which may define a model group that allows a portfolio reference response structure to be included in a message and may include further sub-components, such as portfolioReference sub-component 505;
  EventsOrInfo.model sub-component 503, which may define a model group that allows either details of an event or information about a trade to be provided. This may typically be used in response to a request and may include further sub-components such as:
    Events.model sub-component 506, which may include a choice between a trade and a post-trade event and may include further sub-components, such as:
      originatingEvent sub-component 510
      trade sub-component 511
      amendment sub-component 512
      increase sub-component 513
      terminatingEvent sub-component 514
      termination sub-component 515
      novation sub-component 516
      optionExercise sub-component 517
      optionExpiry sub-component 518
      deClear sub-component 519
      additionalEvent sub-component 520, which may include an additionalEvent element that is an extension/substitution point to customize FpML and add additional events
    TradeReferenceInformation.model sub-component 507, which defines a model group that allows information about a trade to be represented and may include further sub-components, such as tradeReferenceInformation sub-component 521 that may include information about a trade
  PartiesAndAccounts.model sub-component 504, which may include supporting party and account definitions and may include further sub-components, such as:
    party sub-component 508, which may include a legal entity or a subdivision of a legal entity;
    account sub-component 509, which may include optional account information used to precisely define the origination and destination of financial instruments.

Figure 20:
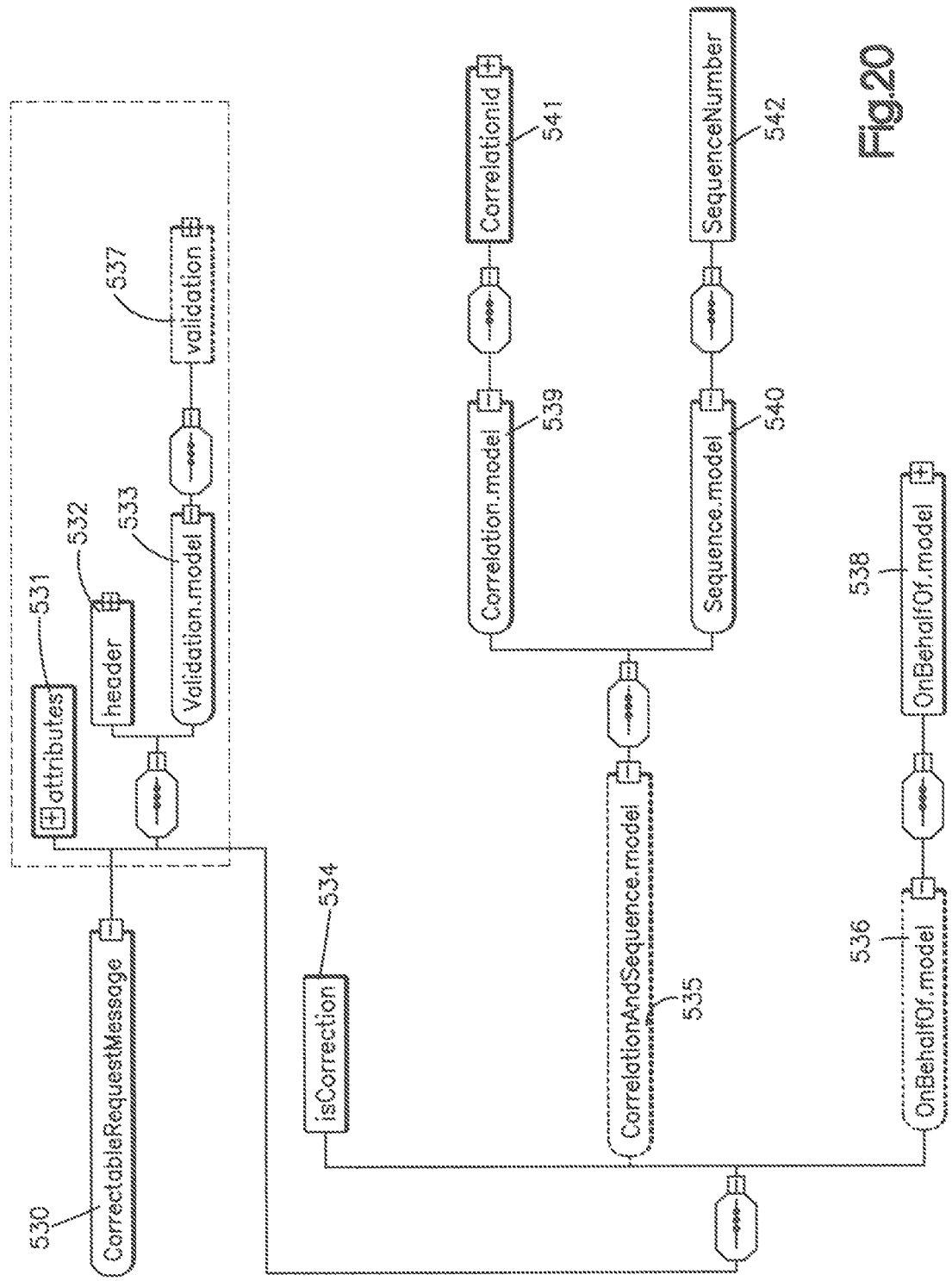
FIG. 20 is a flow diagram depicting an exemplary workflow for a correctable request message event.

"CorrectableRequestMessage" provides the ability for the trading platform 10 to amend or correct a previously sent request for consent ("RequestConsent"), for example trades which are executed. With reference to FIG. 20, an exemplary embodiment of CorrectableRequestMessage sub-component 530 may include a module defining the consent model for a request message that can be subsequently corrected or retracted. The CorrectableRequestMessage sub-component 530 may include a RequestMessage (extension) module, which may include further sub-components, such as an attributes sub-component 531, a header sub-component 532, a Validation.model sub-component 533 and a validation sub-component 537. The CorrectableRequestMessage sub-component 530 may further include the following:
  isCorrection sub-module 534, which preferably indicates if the message corrects an earlier request;
  a CorrelationAndSequence.model sub-component 535, which preferably provides a mechanism for the requester to assign an ID That can be used for subsequent corrections and retractions, without requiring any acknowledgement or reply from the message recipient. The FpML architecture recommends that services support this feature because otherwise requesters cannot correct or retract requests until they receive a reply from the service. If the correlation ID is not supplied by the requester, the recipient should provide a correlation ID in its response, which the requester should retain in case subsequent correction or retractions are required. In this case, the "inReplyTo" element in the message header may be used to link the response to the request. This sub-component may further include:
  Correlation.model sub-component 539, which may be a model group defining the element used for processes correlation. The correlation ID is used to link followup corrections and retractions to the original request and to help identify which replies link to which requests. This sub-component may further include other sub-components, such as a correlationID sub-component 541, which may be a qualified identifier used to correlate between messages;
  Sequence.model sub-component 540, which may be a model group defining the element used for message sequencing, which may include other sub-components, such as sequenceNumber sub-component 542, which may be a numeric value that can be used to order messages which the same correlation identifier from the same sender;

a OnBehalfOf.model sub-component 536, which may include other sub-components, such as onBehalfOf sub-component 538, which may indicate which party (and/or accounts) a trade is being processed for.

Figure 21:
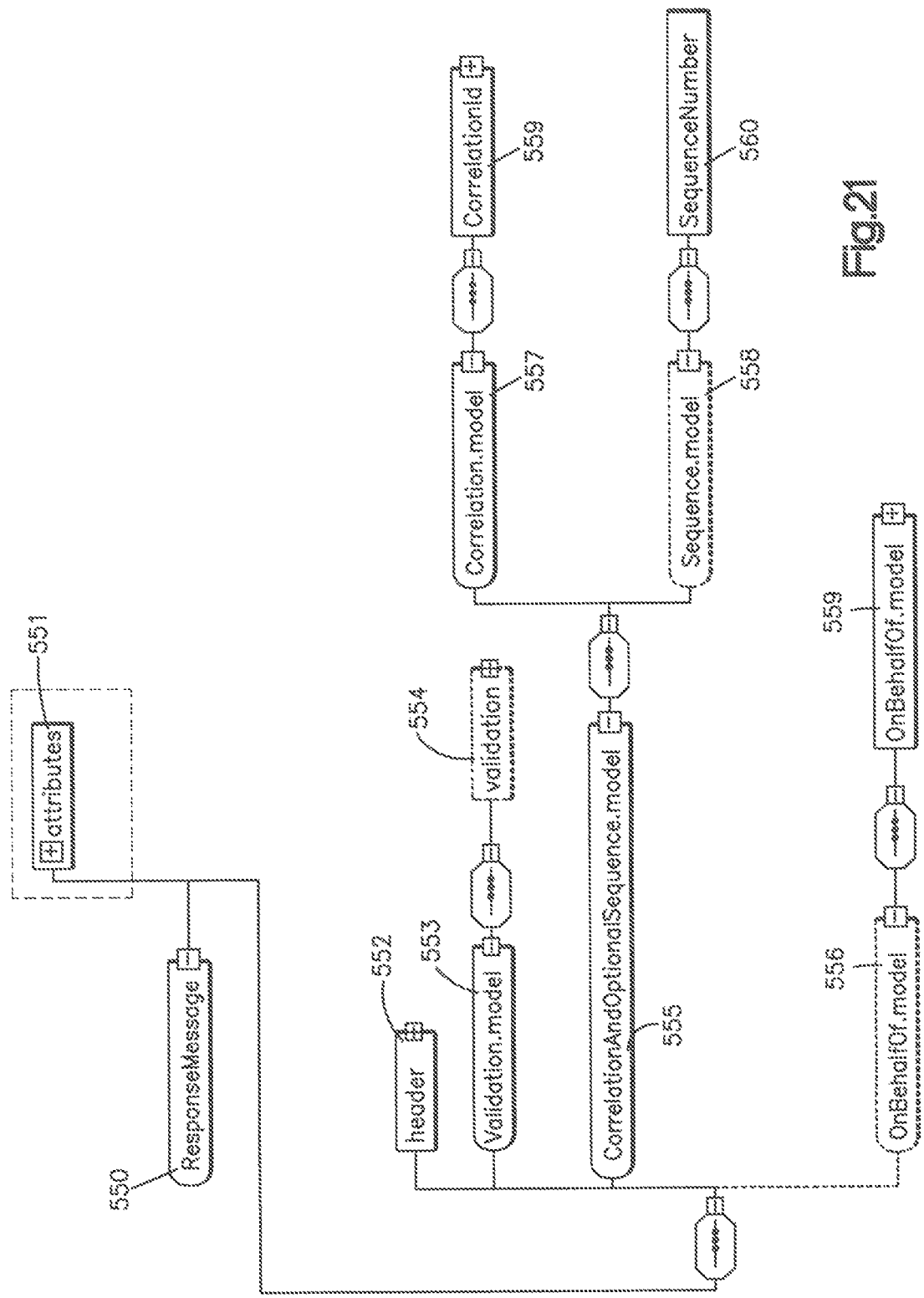
FIG. 21 is a flow diagram depicting an exemplary workflow for a response message event.

"ResponseMessage" allows for a Clearing Member to send a response message. With reference to FIG. 21, an exemplary embodiment of a ResponseMessage event 550 may preferably be a type refining the generic message content model to make it specific to response messages and may include sub-components including without limitation (or any of the other sub-components described herein);

attributes sub-component 551, which may be part of a Message (extension) module;

header sub-component 552;

Validation.model sub-component 553, which may have further sub-components, such as validation sub-component 554;

CorrelationAndOptionalSequence.model sub-component 555, which may be a model group defining the full message correlation mechanism, but with optional sequence. In an exemplary embodiment, for reports generated in a Reporting view, usage of the correlation and sequence model may be depreciated from future versions of the standard and may not be defined in the standard. In exemplary embodiments, ReportReference structure may be used to identify report instances and section numbers if a report is to be divided into chunks. The CorrelationAndOptionalSequence.model sub-component 555 may include sub-components including without limitation (or any of the other sub-components described herein):

Correlation.model sub-component 557, which may be a model group defining the element used for processes correlation. The correlation ID is used to link followup corrections and retractions to the original request and to help identify which replies link to which requests. This sub-component may further include other sub-components, such as a correlationID sub-component 559, which may be a qualified identifier used to correlate between messages;

Sequence.model sub-component 558, which may be a model group defining the element used for message sequencing, which may include other sub-components, such as sequenceNumber sub-component 560, which may be a numeric value that can be used to order messages which the same correlation identifier from the same sender.

OnBehalfOf.model sub-component 556, which may include further sub-components, such as onBehalfOf sub-component 559, which may indicate which party (and/or accounts) a trade is being processed for.

Figure 22:
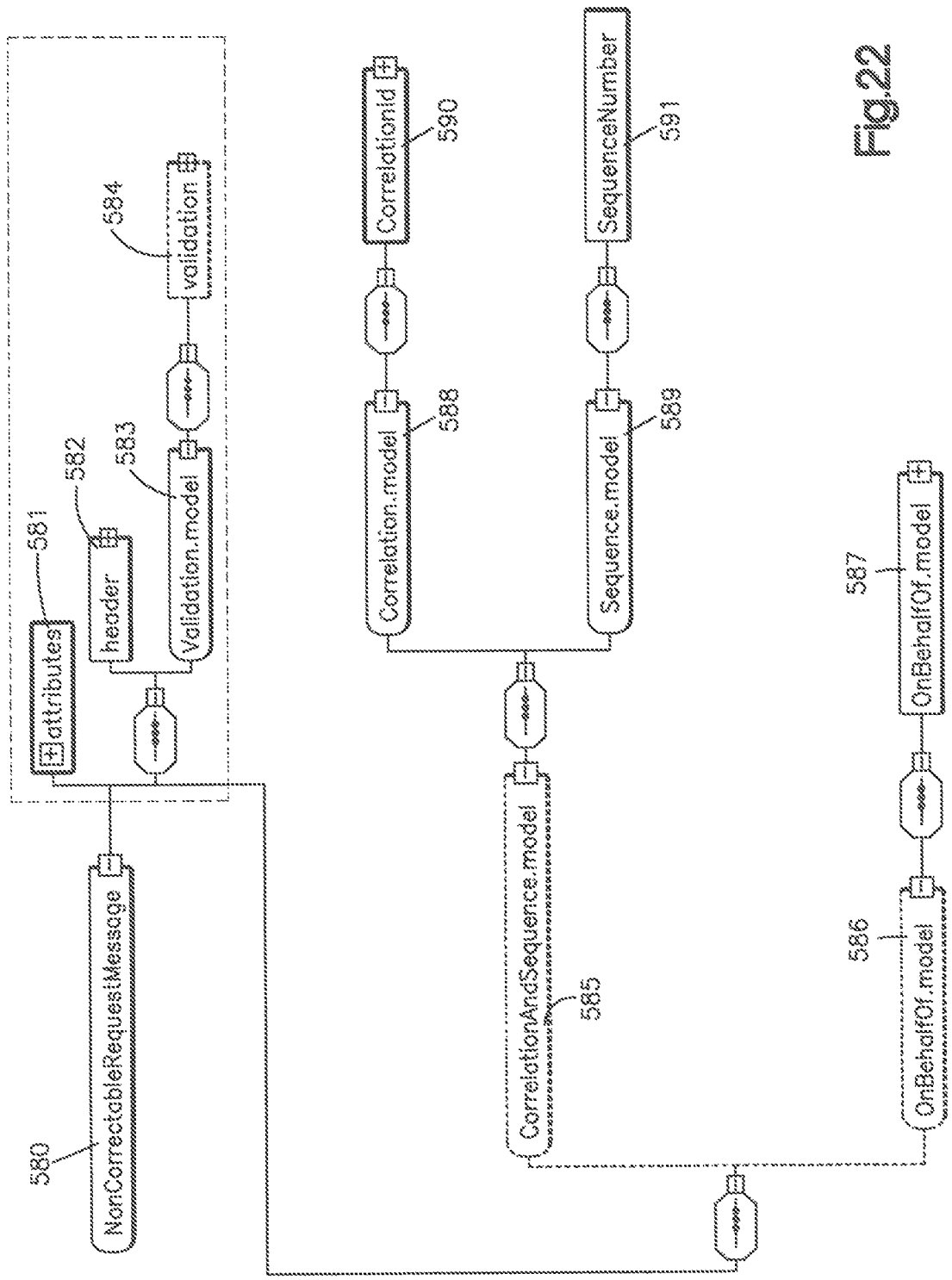
FIG. 22 is a flow diagram depicting an exemplary workflow for a non-correctable request message event.

"NonCorrectableRequestMessage" applies in cases where there can be no further correction, i.e. it is final. With reference to FIG. 22, an exemplary embodiment of a Non-CorrectableRequestMessage event 580 may be a type defining the content model for a request message that cannot be subsequently corrected or retracted and may include sub-components including without limitation (or any of the other sub-components described herein):

attributes sub-component 581, which may be part of a RequestMessage (extension) module;

header sub-component 582;

Validation.model sub-component 583, which may have further sub-components, such as validation sub-component 584;

CorrelationAndOptionalSequence.model sub-component 585, which may be a model group defining the full message correlation mechanism. The correlation ID may be used to link followup corrections and retractions to the original request and to help identify which replies link to which requests. In an exemplary embodiment, an inReplyTo element may also be used for similar purposes, but which may also contain a message identifier rather than a business object identifier. The sequence ID may be used to establish an ordering between multiple messages related to the same business object (which may be identified by the same correlation identifier). It may contain a value that must ascend (possible with gaps) messages on the same correlation ID. The CorrelationAndOptionalSequence.model sub-component 585 may include sub-components including without limitation (or any of the other sub-components described herein):

Correlation.model sub-component 588, which may be a model group defining the element used for processes correlation. The correlation ID is used to link followup corrections and retractions to the original request and to help identify which replies link to which requests. This sub-component may further include other sub-components, such as a correlationID sub-component 590, which may be a qualified identifier used to correlate between messages;

Sequence.model sub-component 589, which may be a model group defining the element used for message sequencing, which may include other sub-components, such as sequenceNumber sub-component 591, which may be a numeric value that can be used to order messages which the same correlation identifier from the same sender;

OnBehalfOf.model sub-component 586, which may include further sub-components, such as onBehalfOf sub-component 587, which may indicate which party (and/or accounts) a trade is being processed for.

In one embodiment, the "consentAcknowledgement" message is issued by the Clearing Member 30 upon receiving "requestConsent" from the trading platform 10. In another embodiment, this message is optional and is not processed by the trading platform 10.

In one embodiment, the "consentException" message is received by the trading platform 10 from a Clearing Member 30 to indicate to the trading platform 10 either that the "requestConsent" message is invalid, or that the Clearing Member's 30 system may not be able or ready to process it at the time. In this case, the trading platform 10 may send a message equivalent to the consent NOT granted Certainty of Clearing Status notification to the executing broker.

Embodiments of the credit limit consent request negotiation preferably does not change any existing credit limit stored within the trading platform 10 database 18 as such negotiation is a process of asking for a credit limit rather than effecting a credit limit change.

In an embodiment, the trading platform 10 provides an override mechanism permitting a customer 20 to override a pending credit check process and to send the trade to the executing broker. In this case, the trading platform 10 also preferably sends a Certainty of Clearing status notification to the executing broker indicating that no clearing approval has been received from the Clearing Member 30.

In an embodiment, the trading platform 10 includes a "timeout" function in connection with Certainty of Clearing status, wherein any credit approved by a Clearing Member 30 is valid only for a predetermined period of time.

In an embodiment, the trading platform 10 also includes a tolerance monitoring function that alerts a Clearing Member 30 when a predetermined level of credit has been used by a particular account. In one embodiment, the trading platform 10 notifies the Clearing Members 30 when a percentage of the total credit (e.g., 80%) associated with an account is used up. Upon receipt of such notice, a Clearing Member 30 could choose to increase the credit limit for the particular account or maintain the current credit limit to prevent trading above the original credit limit.

Figure 23:
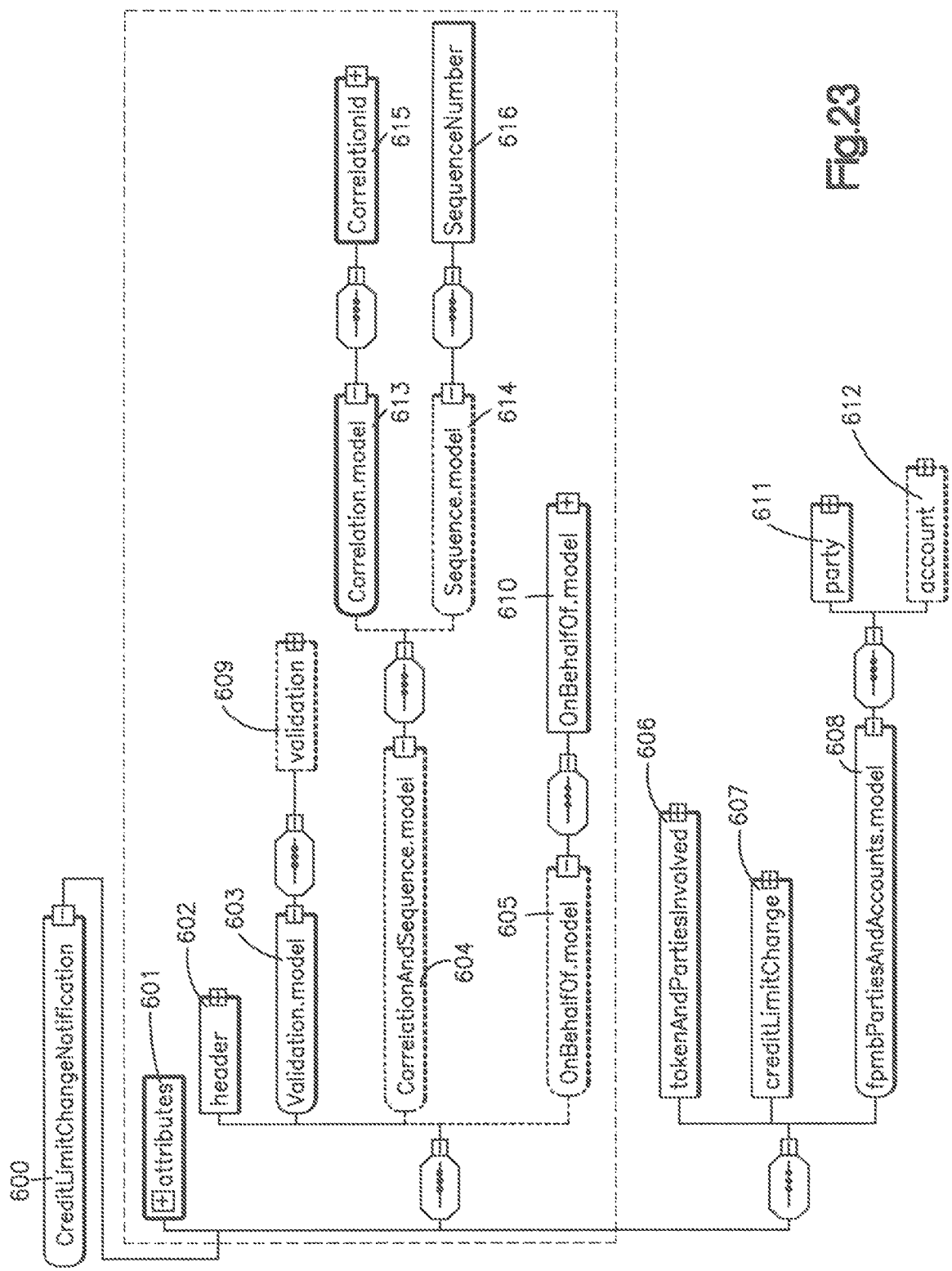
FIG. 23 is a flow diagram depicting an exemplary workflow for a credit limit change notification event.
Figure 24:
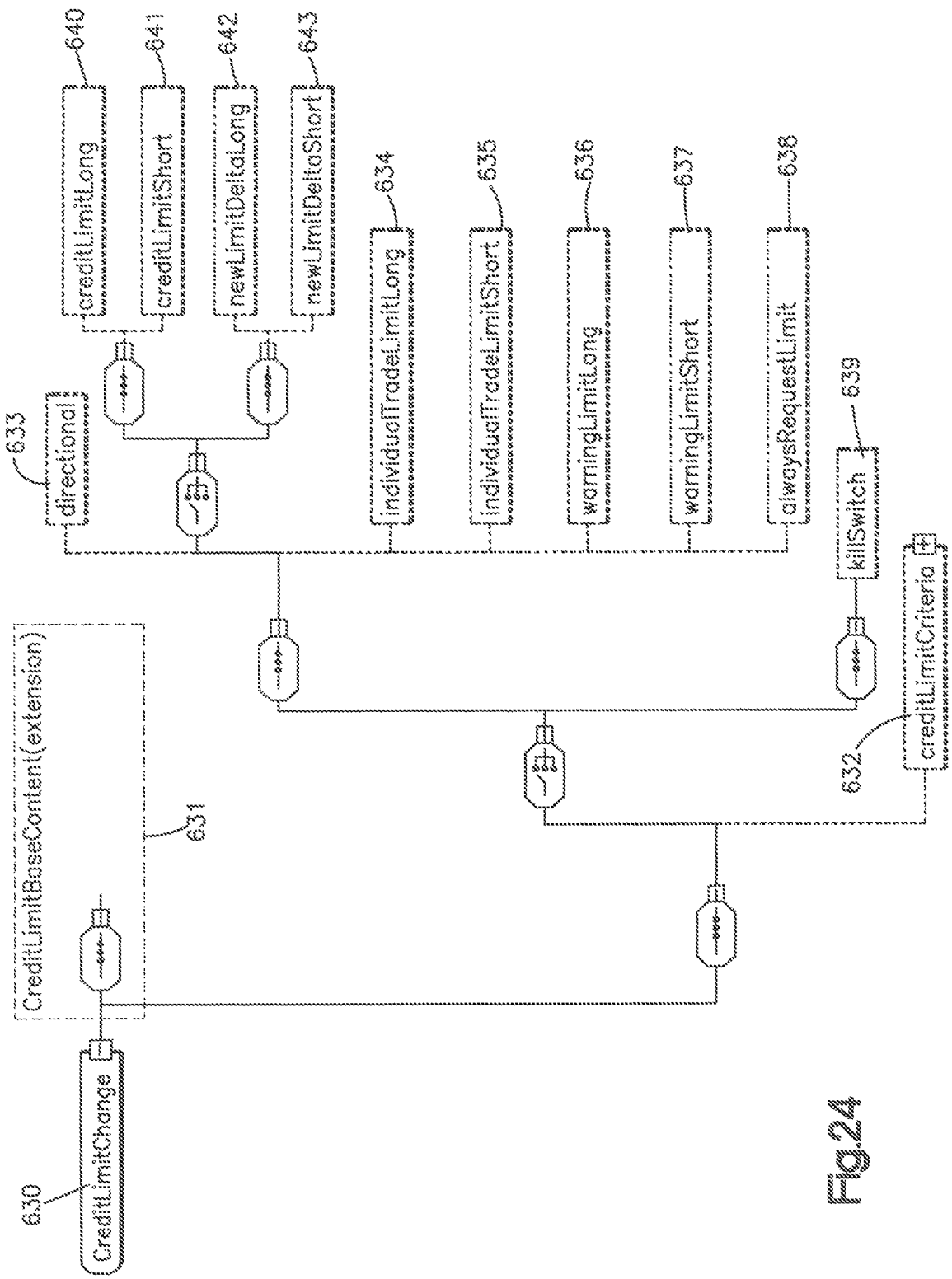
FIG. 24 is a flow diagram depicting an exemplary workflow for a credit limit change event.

In an embodiment, with reference to FIGS. 23-24, a Clearing Member 30 may update or change the level of credit or create a new credit limit for particular customer accounts or firms. In one embodiment, this may be affected via an FpML API, using an unsolicited CreditLimitChangeNotification message. In another embodiment, this may also effect the CreditLimitChange message.

With reference to FIG. 23, an exemplary embodiment of a CreditLimitChangeNotification message 600 may include order limit change notification information and may be capable of unsolicited updates to notify changes regard credit limit. It may include sub-components including without limitation (or any of the other sub-components described herein):

- attributes sub-component 601, which may be part of a fpml NotificationMessage (extension) module;
- header sub-component 602;
- Validation.model sub-component 603, which may have further sub-components, such as validation sub-component 609;
- CorrelationAndOptionalSequence.model sub-component 604, which may be a model group defining the full message correlation mechanism, but with optional sequence. In an exemplary embodiment, for reports generated in a Reporting view, usage of the correlation and sequence model may be depreciated from future versions of the standard and may not be defined in the standard. In exemplary embodiments, ReportReference structure may be used to identify report instances and section numbers if a report is to be divided into chunks. The CorrelationAndOptionalSequence.model sub-component 604 may include sub-components including without limitation (or any of the other sub-components described herein):
  - Correlation.model sub-component 613, which may be a model group defining the element used for processes correlation. The correlation ID is used to link followup corrections and retractions to the original request and to help identify which replies link to which requests. This sub-component may further include other sub-components, such as a correlationID sub-component 615, which may be a qualified identifier used to correlate between messages;
  - Sequence.model sub-component 614, which may be a model group defining the element used for message sequencing, which may include other sub-components, such as sequenceNumber sub-component 616, which may be a numeric value that can be used to order messages which the same correlation identifier from the same sender;
- OnBehalfOf.model sub-component 605, which may include further sub-components, such as onBehalfOf sub-component 610, which may indicate which party (and/or accounts) a trade is being processed for
- tokenAndPartiesInvolved sub-component 606, which may include information about credit limit token id's and the parties involved;
- CreditLimitChange sub-component 607, which may include credit limit changes or updates;
- Fpml: PartiesAndAccounts.model sub-component 608, which may include supporting party and account definitions information and may include further sub-components, such as:
  - Parties sub-component 611, which may be a legal entity or a subdivision of a legal entity;
  - Account sub-component 612, which may include optional account information used to more precisely define the origination and destination of financial instruments;

With reference to FIG. 24, an exemplary embodiment of a CreditLimitChange message 630 may include a notification from the clearing member and may update the credit limit profile of a customer 20. The CreditLimitChange message 630 may include sub-components including without limitation (or any of the other sub-components described herein):

- CreditLimitBaseContent (extension) module 631;
- creditLimitCriteria sub-component 632, which may include the credit limit criteria;
- directional sub-component 633, which may be a sign or absolute value;
- individualTradeLimitLong sub-component 634, which may be the credit limit per trade level in absolute number on the long side, which is usually provided by the clearing member (but need not be);
- individualTradeLimitShort sub-component 635, which may be the credit limit per trade level in absolute number on the short side, which is usually provided by the clearing member (but need not be);
- warningLimitLong sub-component 636, which may be called if the request is a warning on the long side;
- warningLimitShort sub-component 637, which may be called if the request is a warning on the short side;
- alwaysRequestLimit sub-component 638, which may be set by the clearing member to indicate that the system should always request a limit from the clearing member;
- killSwitch sub-component 639, which may be set by the clearing member to indicate that it is no longer able to provide clearing certainty;
- currentLimitLong sub-component 640, which may include the current credit limit (preferably an absolute number) on the long side;
- creditLimitShort sub-component 641, which may include the current credit limit (preferably an absolute number) on the short side;
- newLimitDeltaLong sub-component 642, which may be the delta (increment or decrement +/−) of a new credit limit (which may be provided by the clearing member) on the long side;
- newLimitDeltaShort sub-component 643, which may be the delta (increment or decrement +/−) of a new credit limit (which may be provided by the clearing member) on the short side;

Preferably, a Clearing Member 30 may also set specific limits, or per trade limits, or a warning level for a specific credit limit criteria. The Clearing Member 30 may also set a "kill" or "deactivation" switch to indicate that clearing certainty can no longer be provided by the Clearing Member 30. Preferably, there is no token linkage in this case because the change is initiated unsolicited by a Clearing Member 30 as, in a preferred embodiment, only messages originated by the trading platform 10 and the responses such messages will have a token linkage.

If a trade is cancelled or corrected, or if the trade is done at a level different than the original indicated level, the trading platform 10 preferably reevaluates the impact of such cancellation, correction, or modification on a customer's credit and updates the customer account's credit limit based on the reevaluation to accurately reflect the credit impact of the executed trade.

In an embodiment, with reference to FIGS. 25-28, the trading platform 10 is capable of providing a "deactivation switch" to allow a Clearing Member 30 to shut down a customer's credit on demand (e.g., preferably in real time). An embodiment of the deactivation switch is preferably configured to override a trade negotiation. For example, if a Clearing Member 30 activates a deactivation switch any time prior to trade execution, no trade with that Clearing Member 30 will occur. If the deactivation switch is activated while with a trade already in progress, the customer 20 will be prevented from lifting affected quotes. This may be accomplished, in one embodiment, by disabling select buttons on the user interface so that the trade cannot be completed.

In exemplary embodiments, deactivation switches are preferably available for any of the following scenarios, or any combination thereof:
(1) Deactivate a customer 20 from clearing with a particular Clearing Member 30 (all products, currencies, clearing houses);
(2) Deactivate all customers 20 from clearing with a particular Clearing Member 30 (all products, currencies, clearing houses);
(3) Deactivate a customer 20 from clearing at a certain clearing house with a particular Clearing Member 30;
(4) Deactivate all customers 20 from clearing at a certain clearing house with a particular Clearing Member 30;
(5) Deactivate a customer 20 from clearing a certain product with a particular Clearing Member 30;
(6) Deactivate all customers 20 from clearing a certain product with a particular Clearing Member 30;
(7) Deactivate a customer 20 from clearing a certain currency with a particular Clearing Member 30; and
(8) Deactivate all customers 20 from clearing a certain currency with a particular Clearing Member 30.

Figure 25:
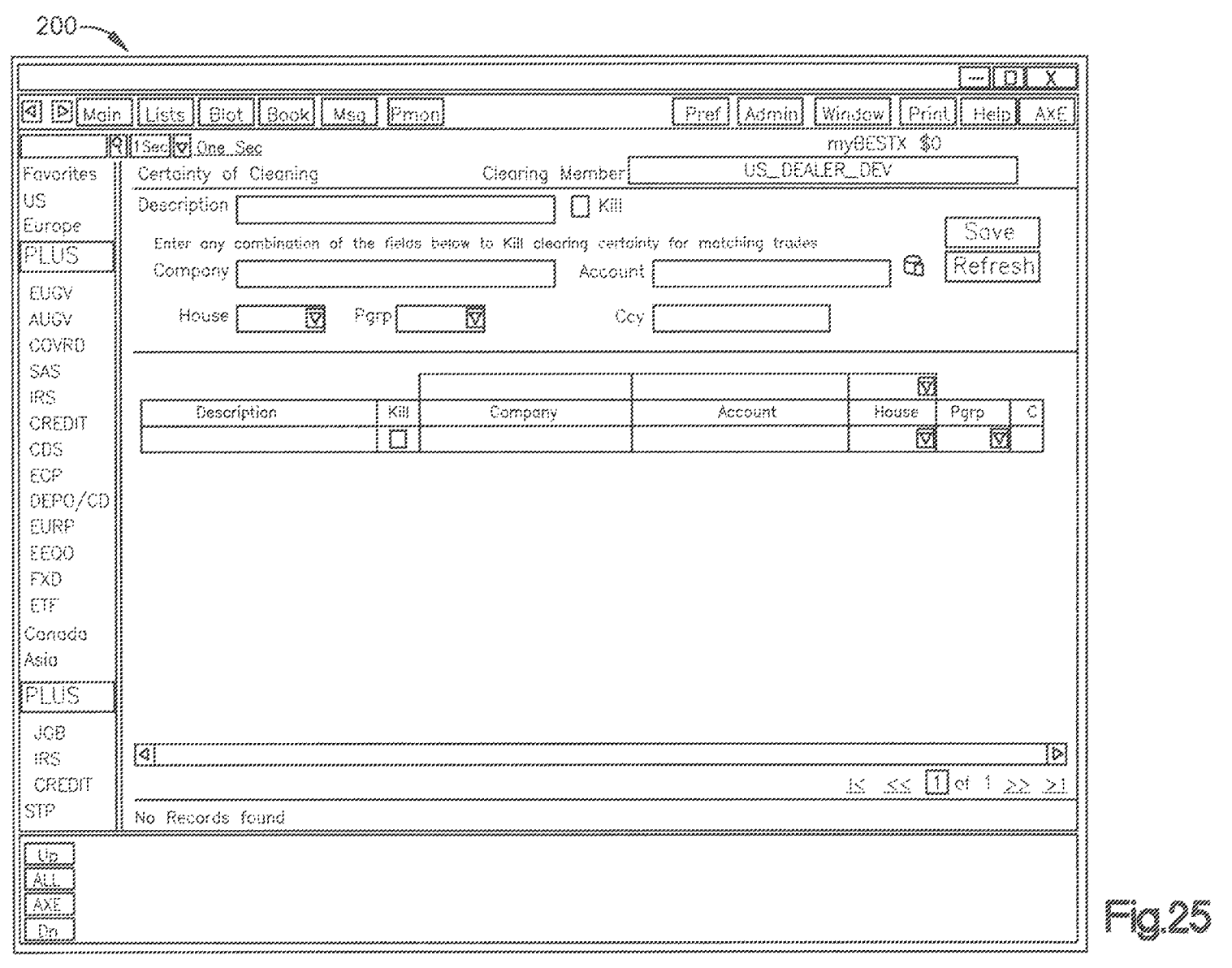
Figure 26:
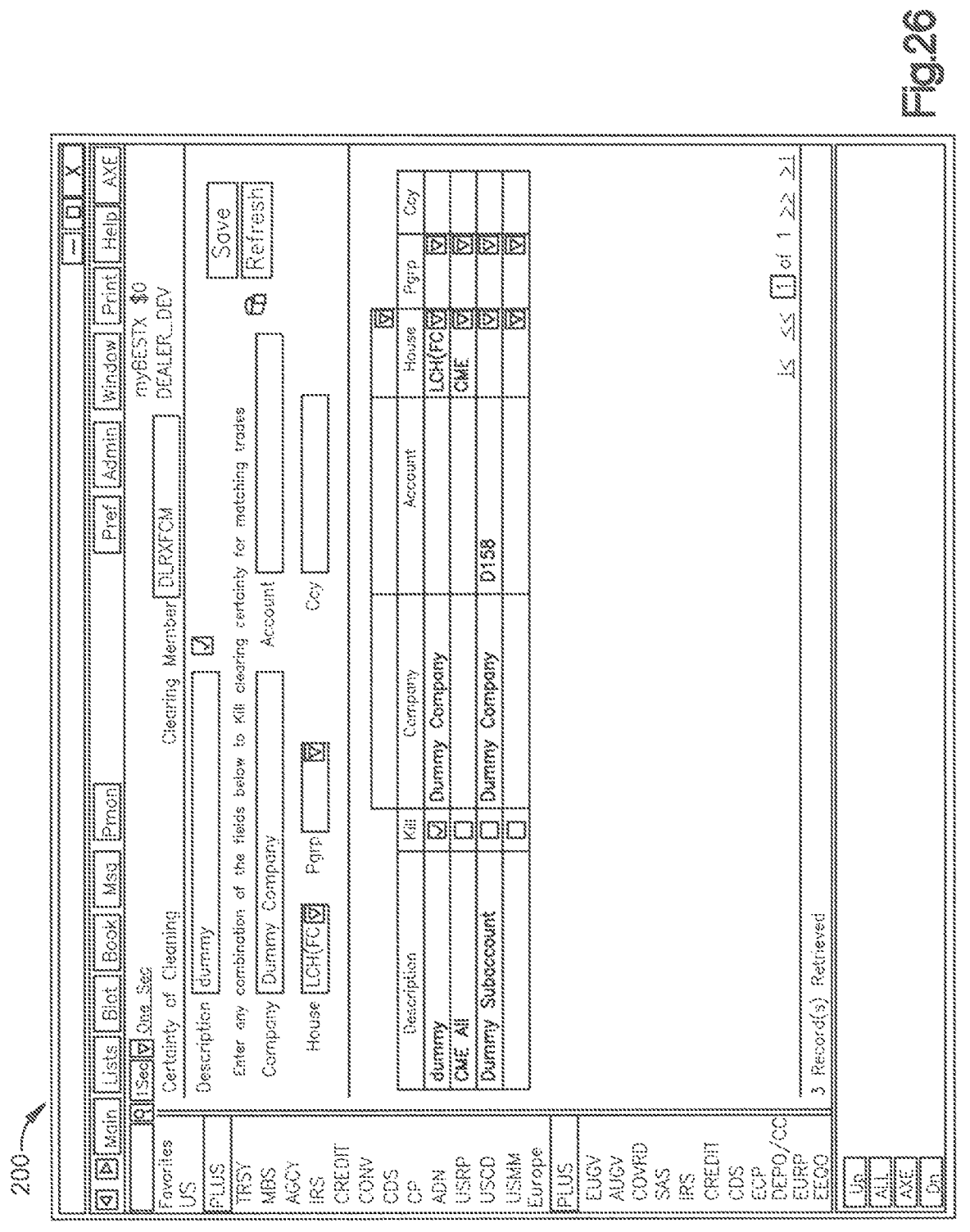

FIGS. 25-26 are screenshots of exemplary embodiments of a deactivation switch input GUI 200. The deactivation switch may be configured to apply to a certain company, sub-account, clearing house, product group, currency, or any combination thereof.

Figure 27:
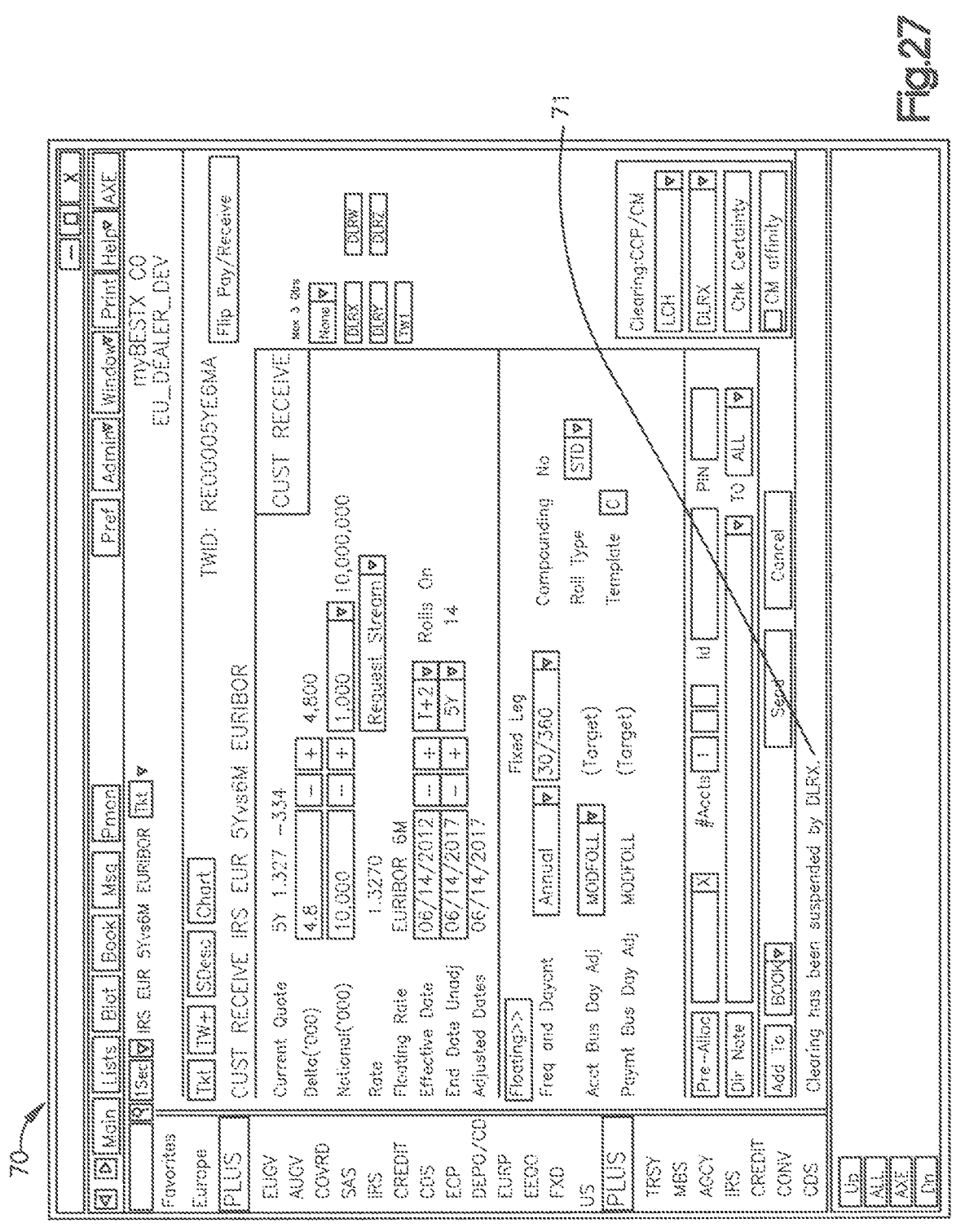

With reference to FIG. 27, the customer's 20 trade ticket GUI 70 may display a message 71 indicating that the Clearing Member has indicated that clearing has been suspended in response to a deactivation switch.

Figure 28:
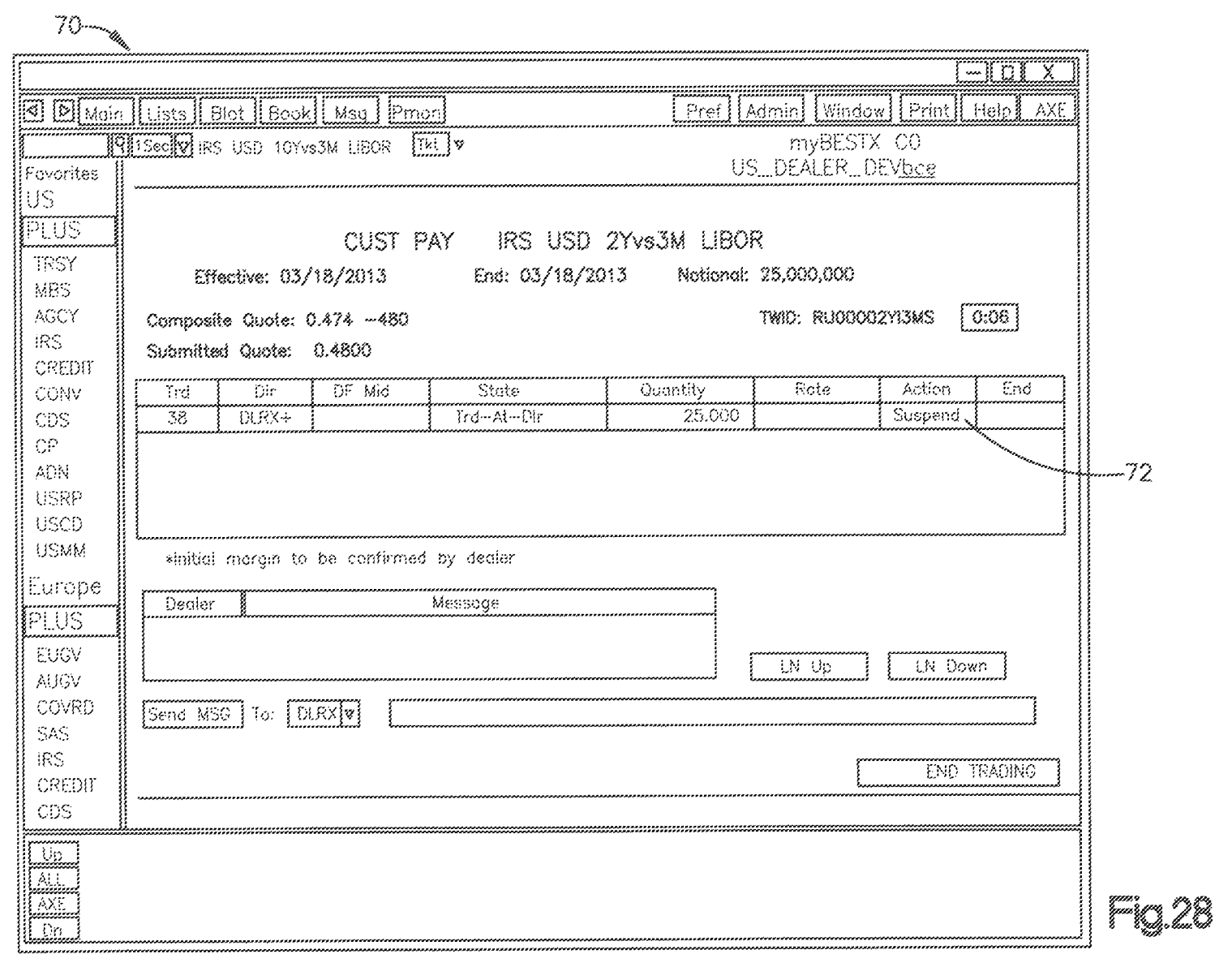

With reference to FIG. 28, a deactivation switch can be used to halt a trade mid-negotiation. In this regard, the trade ticket GUI 70 may provide a suspension notification 72.

Preferably, deactivation switches are not automatically enabled for all Clearing Members 30. The trading platform 10 may retain the ability to enable the deactivation switch with respect to each Clearing Member 30. In certain embodiments, the trading platform 10 has the ability to enable a deactivation switch that may deactivate transactions on a firm level or for individual subaccounts. Deactivation switches can be input and/or activated manually using such a screen or may be input and/or activated via API.

Post trade, the trading platform 10 preferably notifies the Clearing Member 30 about the executed trade and transmits data regarding the details of the trade and the allocation of the trade in which clearing certainty was requested. Preferably, the Clearing Member 30 is not required to respond to these messages.

Figure 29:
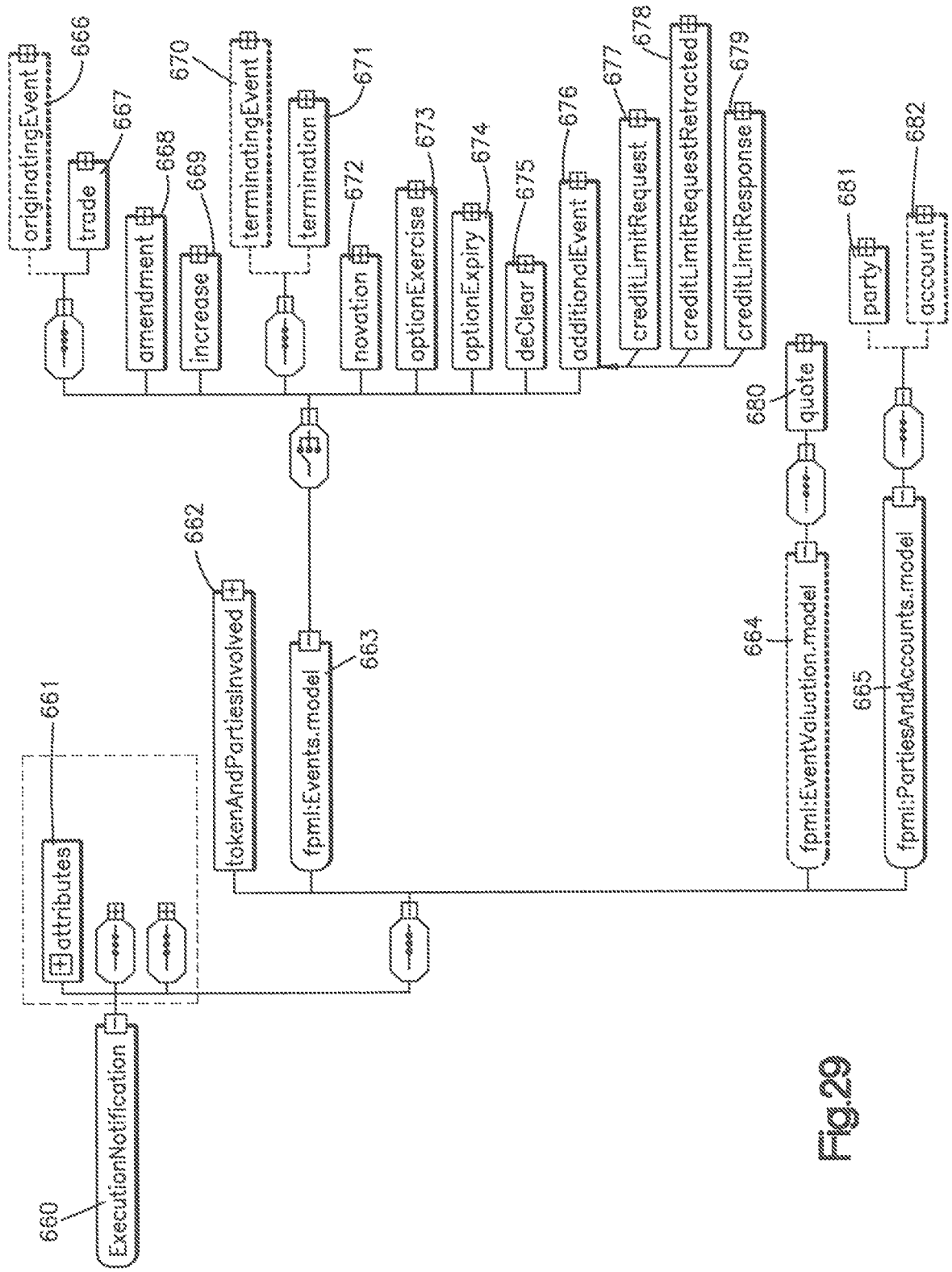
FIG. 29 is a flow diagram depicting an exemplary workflow for an execution notification event.
Figure 30:
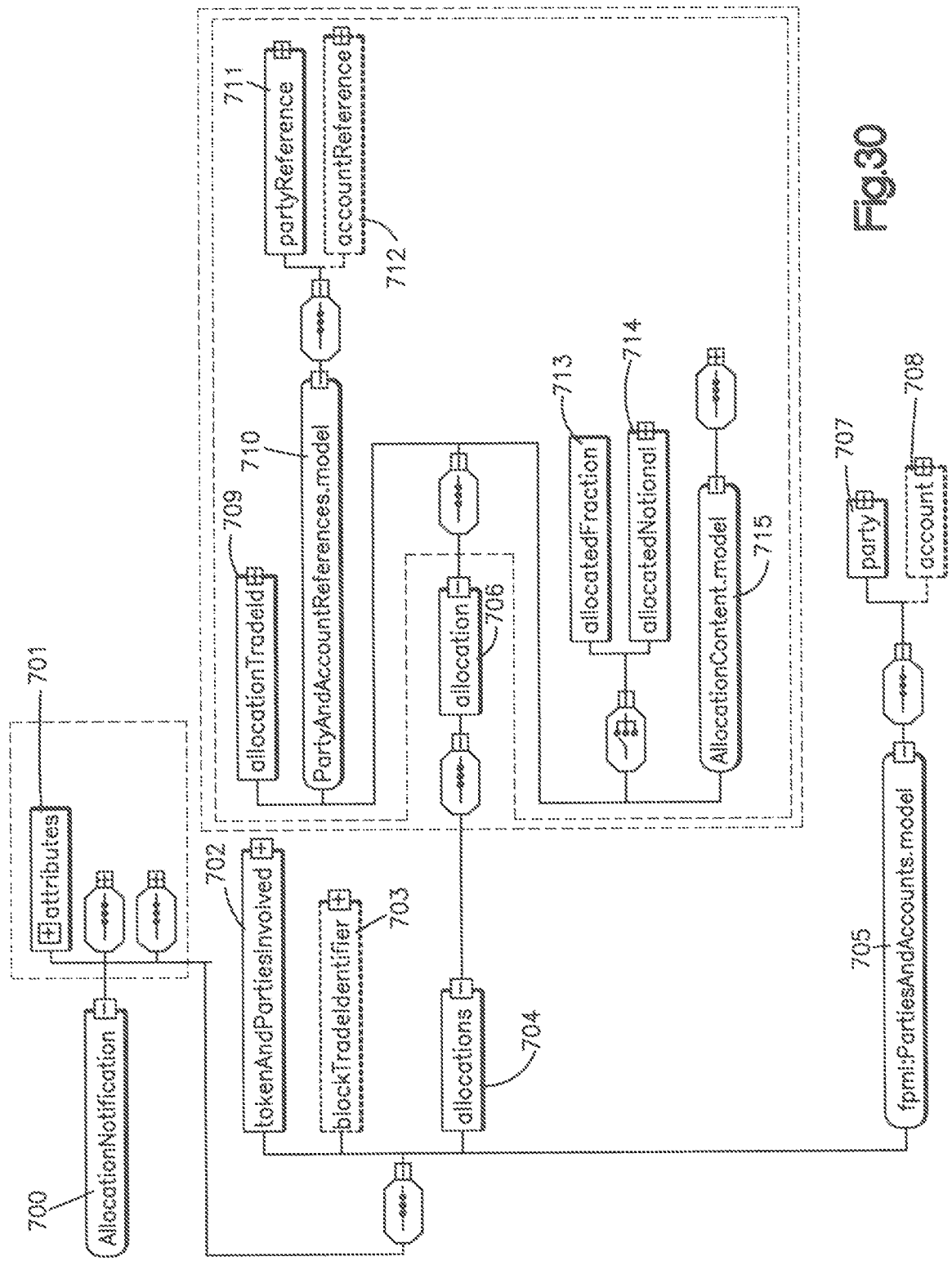
FIG. 30 is a flow diagram depicting an exemplary workflow for an allocation notification event.

In an exemplary embodiment, with reference to FIGS. 29-30, such notifications are preferably linked to the request via the "token" in the "TokenAndPartiesInvolved" supporting element (see supra). Examples of preferred notification message elements are:
(1) ExecutionNotification—to notify the Clearing Member 30 of the executed trade detail (see FIG. 29).
(2) AllocationNotification—to notify the Clearing Member 30 of the breakdown of the trade (see FIG. 30).

With reference to FIG. 29, an exemplary embodiment of a ExecutionNotification message 660 may include sub-components, including without limitation (or any of the other sub-components described herein):
    attributes sub-component 661, which may be part of a Fpml:CorrectableRequestMessage (extension) module
    tokenAndPartiesInvolved sub-component 662, which may include information about credit limit token id's and the parties involved
    fpml:Events.model sub-component 663, which may include a choice between a trade and a post-trade event and may include further sub-components to effect this feature, such as
    OriginatingEvent sub-component 666;
    Trade sub-component 667;
    Amendment sub-component 668;
    Increase sub-component 669;
    terminatingEvent sub-component 670;
    termination sub-component 671;
    novation sub-component 672;
    optionExercise sub-component 673;
    optionExpiry sub-component 674;
    deClear sub-component 675;
    additionalEvent sub-component 676, which may be an extension/substitution point to customize FpML and add additional events
    creditLimitRequest sub-component 677
    creditLimitRequestRetracted sub-component 678
    creditLimitResponse sub-component 679
    fpml:EventValuation.model sub-component 664, which may be a model group holding valuation information for an event and may include further sub-components to effect this feature, such as quote sub-component 680, which may include pricing information for the trade; and
    fpml:PartiesAndAccounts.model sub-component 665, which may include information about supporting parties and account definitions and may include further sub-components, such as party sub-component 681, which may include a legal entity or a subdivision of a legal entity, and account sub-component 682, which includes optional account information used to precisely define the origination and destination of financial instruments.

With reference to FIG. 30, an exemplary embodiment of a AllocationNotification message 700 may be an allocation notification from the trading platform 10 and may include sub-components, including without limitation (or any of the other sub-components described herein):

attributes sub-component 701, which may be part of a Fpml:CorrectableRequestMessage (extension) module
tokenAndPartiesInvolved sub-component 702, which may include information about credit limit token id's and the parties involved
blockTradeIdentifier sub-component 703
allocations sub-component 704 which may include further sub-components such as:
  allocation sub-component 706
  one or more fpml:Allocations module
  allocationTraded sub-component 709, which may include a unique ID for the allocation
  PartyAndAccountReferences.model sub-component 710, which may include sub-components such as partyReference sub-component 711, which may be a reference to a party, and accountReference sub-component 712, which may be a reference to an account
  allocatedFaction sub-component 713, which may be the factional allocation (e.g., (0.45=45%) of the notational and "block" fees to a particular client subaccount
  allocatedNotional sub-component 714, which may be the notional allocation (amount and/or currency) to a particular client account
  AllocationContent.model sub-component 715
PartiesAndAccounts.model sub-component 705, which may include information relating to supporting parties and account definitions and further include a party sub-component 707, which may be a legal entity or a subdivision of a legal entity, and an account sub-component 708, which may include optional account information used to precisely define the origination and destination of financial instruments In embodiments involving a multi-legged trade, ExecutionNotification is preferably generated per leg and the AllocationNotification is preferably generated per ExecutionNotification.

Figure 31:
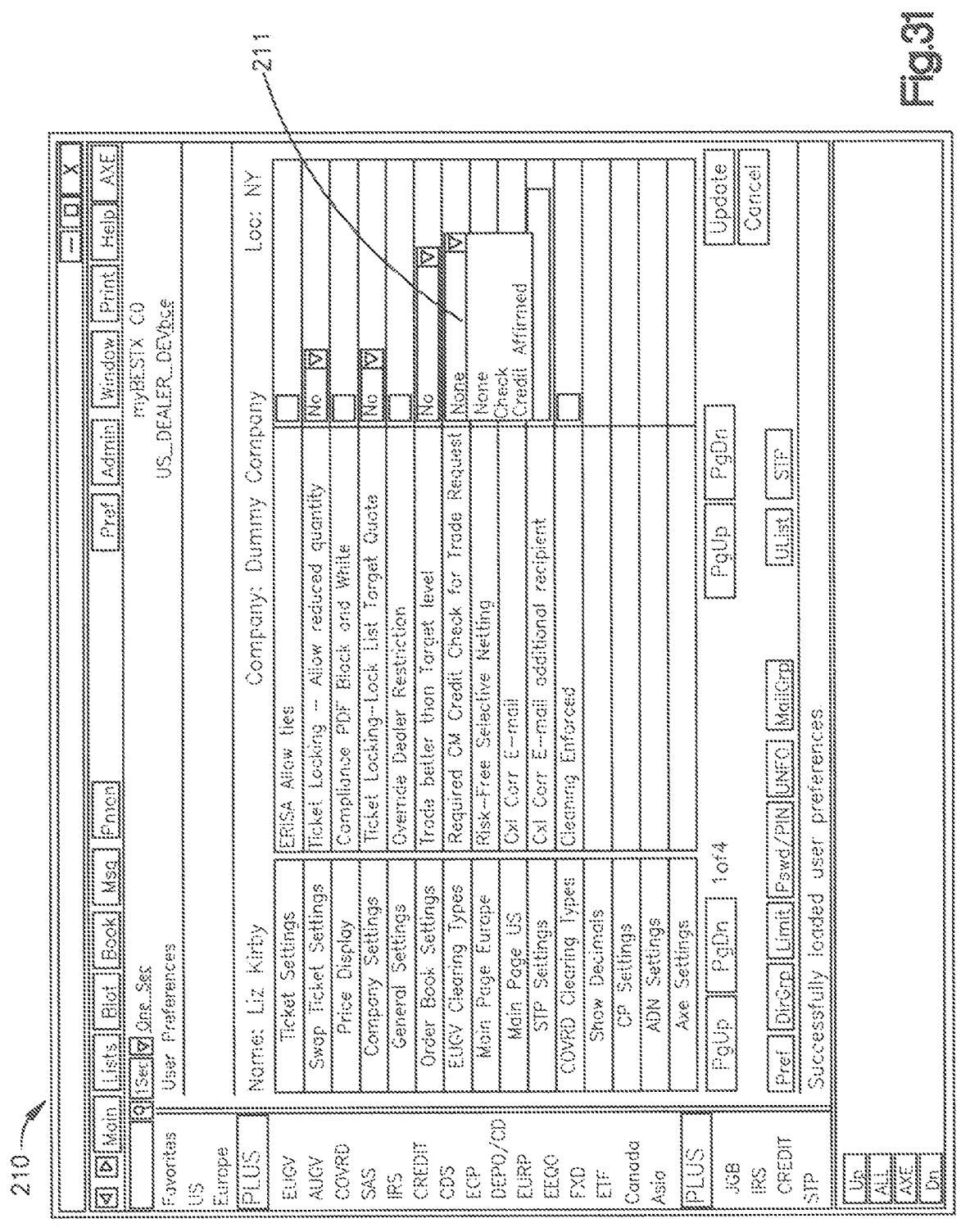

In an exemplary embodiment, with reference to FIG. 31, the trading platform 10 also permits a corporate user of the trading platform 10 to implement company-wide clearing certainty preferences via a preference GUI 200. The preference GUI preferably includes one or more preference fields 211. Using the preference fields 211, the company can choose to implement preferences applicable to all of the company's traders. For example, the company can ensure their traders either:

(1) Check for certainty prior to trading (but may trade even with a negative result); or
(2) Trader must obtain Certainty (i.e. credit granted from FCM) in order to trade.

It will be appreciated that the interfaces, GUI's, workflows, messages, events, and other software discussed and depicted herein are only exemplary and can be altered without departing from the scope of the invention as will be appreciated by one of ordinary skill in the art.

It should be noted that references herein to phrases such as "one embodiment" or "an embodiment" means that a particular feature, structure or characteristic described in connection with the embodiment is included in at least one embodiment of the invention. The phrases such as "in one embodiment" or "in certain embodiments" in various places in the specification are not necessarily, but can be, referring to the same embodiment. Use of the term "preferred" or "preferably" is intended to indicate a configuration, set-up, feature, process, or alternative that may be perceived by the inventor(s) hereof, as of the filing date, to constitute the best, or at least a better, alternative to other such configurations, set-ups, features, processes, or alternatives. In no way shall the use of the term "preferred" or "preferably" be deemed to limit the scope of the claims hereof to any particular configuration, set-up, feature, process, or alternative.

It will be further appreciated by those skilled in the art that the figures are purely illustrative, and that the system may be implemented in any number of ways, by the actual designers, as long as the functionality, relating to the trading in financial instruments through a system that assists in managing credit limits and/or credit risk, stays intact. Furthermore, with regard to one or more of the figures, diagrams, and/or charts shown herein, due to limitation in capturing the entire screenshot into one picture, such figures, diagrams, and/or charts depict exemplary embodiments of the described subject matter taken in pieces that reference other pieces.

While there have been shown and described fundamental novel features of the invention as applied to the exemplary embodiments thereof, it will be understood that omissions and substitutions and changes in the form and details of the disclosed invention may be made by those skilled in the art without departing from the broad inventive concept thereof. It is understood, therefore, that this invention is not limited to the particular embodiments disclosed, but it is intended to cover modifications within the spirit and scope of the present invention.

The invention claimed is:

1. A system for determining clearing certainty of trades between one or more customers and one or more dealers, the system in communication with one or more customer computer systems, one or more clearing member computer systems and one or more dealer computer systems having software operable thereon for permitting communication through the system, the system comprising:
  a message system operable to transmit and receive messages from the one or more customers and the one or more dealers;
  a request system including one or more computer systems operative to:
    accept trade order data from the one or more customers requesting a trade order;
    receive clearing certainty data for the trade order from the one or more dealers; and
    receive clearing certainty data from the one or more dealers;
  a database system operative to store credit limit data associated with at least one of the one or more customers and the trade order, the database system comprising a database configured to store credit limit data associated with one or more customers;
  a risk system operative to calculate credit risks relating to at least one of the one or more customers and the trade order;
  a clearing certainty system operative to determine a clearing certainty status for the trade order and communicating the clearing certainty status to the one or more customers;
  wherein the system is operative with programming to:
    receive a clearing certainty request for a trade order, which request is generated from a customer's user interface;
    determine whether the database system contains credit limit data, wherein when the credit limit data is present in the database system, the system determines the clearing certainty status based on the credit limit data in the database; and communicates the clearing certainty status to the one or more customers; and in response to a signal sent from the one or more clearing member computers, override negotiation of a trade resulting from the trade order, by disabling at least a portion of the customer's user interface so that the trade cannot be completed.

2. The system of claim 1, wherein the system is further operative with programming such that when the credit limit data is not present in the database system, the system:

transmits a request for clearing certainty based on at least a portion of the trade order data to the one or more dealers;

receives clearing certainty data from the one or more dealers;

determines the clearing certainty status based on the clearing certainty data; and communicates the clearing certainty status to the one or more customers.

3. The system of claim 1 further comprising:

a limit system operative to compare at least a portion of the trade order data with at least a portion of the credit limit data.

4. The system of claim 3 wherein the limit system compares at least a portion of the trade order data with at least a portion of the credit limit data at a time of a trade.

5. The system of claim 1 wherein the credit limit data may direct the system to transmit the request for clearing certainty to the one or more dealers.

6. The system of claim 1 further comprising:

an execution system in communication with one or more broker computer systems, wherein the execution system is operative to send at least a portion of the trade order data to one or more brokers for executing a trade.

7. The system of claim 6 wherein the customer user interface permits the one or more customers to elect to execute the trade.

8. The system of claim 7 wherein the message system is operative to transmit and receive messages from the one or more brokers.

9. The system of claim 8 wherein the message system transmits a message to the one or more brokers containing the clearing certainty status.

10. The system of claim 7 wherein the message system is operative to send the one or more dealers a message notifying the one or more dealers of a trade execution.

11. A method for determining clearing certainty of trades between one or more customers, one or more clearing members and one or more dealers on a system in communication with one or more customer computer systems, one or more clearing member computers and one or more dealer computer systems, the method comprising:

transmitting and receiving messages from the one or more customers and the one or more dealers;

accepting trade order data from the one or more customers requesting a trade order;

obtaining clearing certainty data from the one or more clearing members;

receiving a clearing certainty request for a trade order generated from a customer's user interface;

calculating credit risks relating to at least one of the one or more customers and the trade order based at least upon the clearing certainty data;

determining a clearing certainty status for the trade order;

communicating the clearing certainty status to the one or more customers; and overriding negotiation of a trade resulting from the trade order based on the clearing certainty status, by disabling at least a portion of the customer's user interface so that the trade cannot be completed.

12. The method of claim 11 further comprising:

providing a deactivation system that includes a dealer interface that permits the one or more dealers to terminate a credit of the one or more customers.

* * * * *